(12) United States Patent
Anthony et al.

(10) Patent No.: US 11,318,532 B2
(45) Date of Patent: May 3, 2022

(54) THREE-DIMENSIONAL (3D) PRINTING

(71) Applicant: HEWLETT-PACKARD DEVELOPMENT COMPANY, L.P., Houston, TX (US)

(72) Inventors: Thomas Anthony, Palo Alto, CA (US); Kristopher Erickson, Palo Alto, CA (US); Howard S. Tom, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 848 days.

(21) Appl. No.: 16/077,183

(22) PCT Filed: Jul. 19, 2017

(86) PCT No.: PCT/US2017/042746
§ 371 (c)(1),
(2) Date: Aug. 10, 2018

(87) PCT Pub. No.: WO2019/017926
PCT Pub. Date: Jan. 24, 2019

(65) Prior Publication Data
US 2021/0178466 A1    Jun. 17, 2021

(51) Int. Cl.
*B22F 10/10*      (2021.01)
*B33Y 10/00*      (2015.01)
(Continued)

(52) U.S. Cl.
CPC ............ *B22F 1/105* (2022.01); *B22F 3/1017* (2013.01); *B22F 10/10* (2021.01); *B22F 2998/10* (2013.01); *B33Y 10/00* (2014.12); *B33Y 70/00* (2014.12)

(58) Field of Classification Search
CPC ..... B22F 1/007; B29C 64/106; B29C 64/112; B29C 64/124; B29C 64/129;
(Continued)

(56) References Cited

U.S. PATENT DOCUMENTS 4,105,747 A  *  8/1978  Eisele ........................ C01F 7/58
                                              423/263
6,508,980 B1 *  1/2003  Sachs ...................... B22F 10/10
                                              419/45
(Continued)

FOREIGN PATENT DOCUMENTS

CN           1671797 A      9/2005
CN         101080294 A     11/2007
(Continued)

OTHER PUBLICATIONS

Allen et al., "Three-dimensional Printing of Metal Parts for Tooling and Other Applications", Metals and Materials, vol. 6, No. 6, 2000, pp. 589-594.
(Continued)

*Primary Examiner* — Vanessa T. Luk
(74) *Attorney, Agent, or Firm* — HPI Patent Departmnet

(57) ABSTRACT

Methods of forming 3D printed metal objects and compositions for 3D printing are described herein. In an example, a method of forming a 3D printed metal object can comprise: (A): a build material comprising at least one metal being deposited; (B): a fusing agent being selectively jetted on the build material, the fusing agent comprising: (i) at least one hydrated metal salt having a dehydration temperature of from about 100° C. to about 250° C., and (ii) a carrier liquid comprising at least one surfactant and water; (C): the build material and the selectively jetted fusing agent being heated to a temperature of from about 100° C. to about 250° C. to: (a) remove the carrier liquid, (b) dehydrate the hydrated metal salt, and (c) bind the build material and the selectively
(Continued)

jetted fusing agent; and (D): (A), (B), and (C) being repeated at least one time to form the 3D printed metal object.

13 Claims, 11 Drawing Sheets

(51) Int. Cl.
*B22F 1/105* (2022.01)
*B22F 3/10* (2006.01)
*B33Y 70/00* (2020.01)

(58) Field of Classification Search
CPC ..... B29C 64/135; B29C 64/165; B33Y 10/00; B33Y 30/00; B33Y 40/00; B33Y 40/10; B33Y 40/20; B33Y 70/00; B33Y 70/10
See application file for complete search history.

(56) References Cited

U.S. PATENT DOCUMENTS

| | | | |
|---|---|---|---|
| 7,141,207 | B2 | 11/2006 | Jandeska et al. |
| 7,220,380 | B2 | 5/2007 | Farr et al. |
| 7,241,415 | B2 | 7/2007 | Khoshnevis |
| 10,232,437 | B1 * | 3/2019 | Yavari ............... B22F 10/40 |
| 2004/0094058 | A1 | 5/2004 | Kasperchik et al. |
| 2011/0052803 | A1 | 3/2011 | Bao et al. |
| 2012/0211284 | A1 | 8/2012 | DiGiovanni |
| 2013/0323440 | A1 | 12/2013 | Fu et al. |
| 2015/0035209 | A1 | 2/2015 | Shah et al. |
| 2016/0236412 | A1 | 8/2016 | Kusahara et al. |
| 2016/0272844 | A1 | 9/2016 | Osaka et al. |
| 2017/0145584 | A1 | 5/2017 | Wirth et al. |

FOREIGN PATENT DOCUMENTS

| | | |
|---|---|---|
| CN | 103612393 A | 3/2014 |
| CN | 105658416 A | 6/2016 |
| CN | 106457688 A | 2/2017 |
| CN | 106493943 A | 3/2017 |
| JP | 2010-285633 A | 12/2010 |
| RU | 2535704 C1 | 12/2014 |
| WO | 2015046629 A1 | 4/2015 |
| WO | WO-2017014785 A1 | 1/2017 |
| WO | WO-2017018985 A1 | 2/2017 |

OTHER PUBLICATIONS

Jakus et al., "Metallic Architectures from 3D-Printed Powder-Based Liquid Inks", Advanced Functional Materials, vol. 25, Issue 45, Retrieved from Internet: http://onlinelibrary.wiley.com/doi/10.1002/adfm.201503921/full, Nov. 16, 2015, 3 pages. (Abstract only).

Khoshnevis et al., "Metallic Part Fabrication Using Selective Inhibition Sintering (SIS)", Rapid Prototyping Journal, vol. 18, Issue 2, Retrieved from Internet: http://www-bcf.usc.edu/~yongchen/Research/SIS-Metal-RPJ.pdf, 2012, 16 pages.

Morris, "A New Way to Print 3-D Metals and Alloys", Northwestern University, Retrieved from Internet: http://www.mccormick.northwestern.edu/news/articles/2016/01/a-new-way-to-print-3-d-metals-and-alloys.html, Jan. 11, 2016, 4 pages.

Yoo, "Reactive Binders for Metal Parts Produced by Three Dimensional Printing", Massachusetts Institute of Technology, Retrieved from Internet: https://dspace.mit.edu/handle/1721.1/32315#files-area, 1997, 107 pages.

* cited by examiner

THREE-DIMENSIONAL (3D) PRINTING

BACKGROUND

Three-dimensional (3D) printing may be an additive printing process used to make three-dimensional solid parts from a digital model. 3D printing can be often used in rapid product prototyping, mold generation, mold master generation, and short run manufacturing. Some 3D printing techniques are considered additive processes because they involve the application of successive layers of material. This is unlike customary machining processes, which often rely upon the removal of material to create the final part. 3D printing can often use curing or fusing of the building material, which for some materials may be accomplished using heat-assisted extrusion, melting, or sintering.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
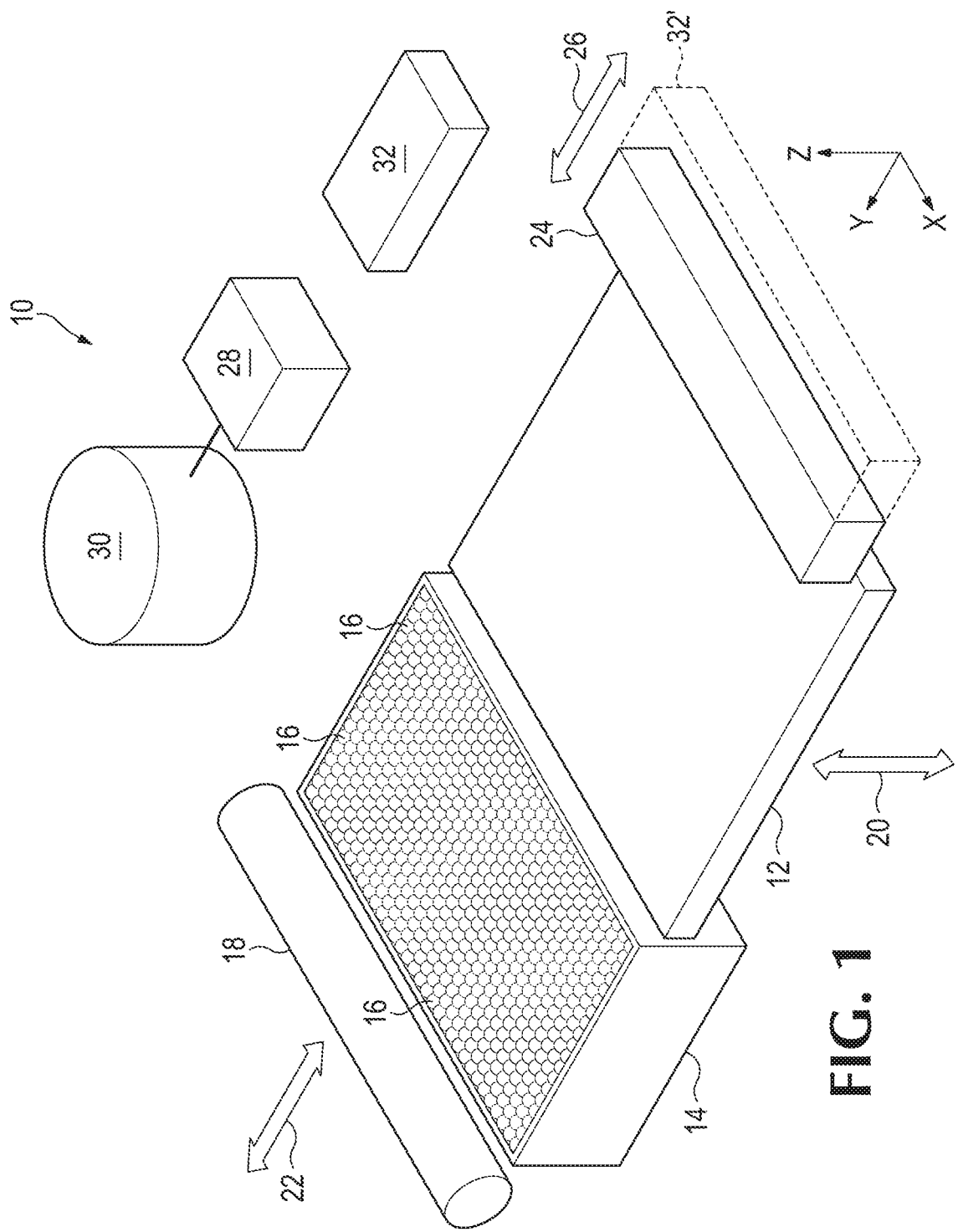
FIG. 1 is a simplified isometric view of an example 3D printing system disclosed herein.

For producing small quantities of complex mechanical parts made of metal, the default approach has been machining. Machining is a skill-intensive method and thus may be costly. Increasingly, metallic 3D objects/parts can be produced by 3D printing. 3D printing however faces challenges in producing high strength parts suitable for replacing metal parts. Many of the materials that are capable of being 3D printed lack the targeted mechanical strength of metallic parts produced by common machining. 3D printing has been used to rapidly produce casting molds or "lost wax" materials to speed up the formation of metal parts. Some attempts have been made to adjust the 3D printing approach to metals by depositing metal-polymer composites. A part is formed by building up layer after layer of material. Adjusting of inkjet printing technology has offered precise deposition of multiple materials as part of a 3D printing process. After forming, the polymer-metal hybrid part is then subjected to a high temperature process to burn away the polymer and consolidate the metal part.

Two challenges presented by polymer binders are: 1) low fracture strength in the printed polymer-metal hybrid parts and 2) complete loss of fracture strength in the printed polymer-metal parts after burning away the polymeric binder. Low strength in the printed polymer-metal hybrid parts makes it difficult to handle parts; i.e., removing parts from the printer, cleaning parts, and transferring parts to a sintering furnace can lead to breakage. Loss of binding strength after burning away the polymer can cause part collapse due to gravitational forces acting on the part. Additionally, any external force experienced at this stage can damage or break the part.

There is therefore still a demand for 3D printed metal objects that have high fracture strengths. The examples described hereinbelow show that dehydrated metal salt bound 3D printed metal object can be stronger with high fracture strengths compared with a 3D printed metal object using polymeric binders.

The examples described hereinbelow also show that because of retention of the metal component (i.e., metal from the hydrated metal salt) during the entire process (e.g., printing, decomposition, reduction, or sintering), the strength of the 3D metal object can be maintained through the 3D printing process while also mitigating distortion during sintering. This is in contrast with polymeric binders that are burned off/removed during the 3D printing process and/or sintering leaving gaps in the 3D metal object structure, which makes such 3D metal object weak.

As used herein, the term "patterned 3D printed metal object" refers to an intermediate part that has a shape representative of the final 3D printed part and that includes metallic build material patterned with a fusing agent. In the patterned 3D printed metal object, the metallic build material particles may or may not be weakly bound together by at least one component of the fusing agent and/or by attractive force(s) between the metallic build material particles and the fusing agent. It is to be understood that any metallic build material that is not patterned with the fusing agent is not considered to be part of the patterned 3D printed metal object, even if it is adjacent to or surrounds the patterned 3D printed metal object.

As used herein, the term "3D printed metal object" refers to a patterned 3D printed metal object that has been exposed to a heating process that dehydrates the hydrated metal salt in the fusing agent and that may also contribute to the evaporation of the liquid components of the fusing agent. The heating process can, in some examples, decompose a portion of the dehydrated metal salt to form a corresponding metal oxide. The dehydrated metal salt binds the metallic build material particles and creates or strengthens the bond between the metallic build material particles. In other words, the "3D printed metal object" is an intermediate part with a shape representative of the final 3D printed part and that includes metallic build material bound together by at least substantially dehydrated metal salt in the fusing agent (with which the metallic build material was patterned). Compared to the patterned 3D printed metal object, the mechanical strength of the 3D printed metal object is greater, and in some instances, the 3D printed metal object can be handled or extracted from the build material platform.

As used herein, the term "at least substantially hydrated metal salt free 3D printed metal object" refers to a 3D printed metal object that has been exposed to a heating process that completes dehydration of the metal salt and in some instances promotes partial thermal decomposition of the metal salt to the corresponding metal oxide of the hydrated metal salt. The result of this heating is to remove the hydrated metal salt from the 3D printed metal object leaving behind dehydrated metal salt and in some instances a small amount of the corresponding metal oxide. In some instances, any remaining liquid and/or volatile organic components from the fusing agent are completely removed. In other words, the "at least substantially hydrated metal salt free 3D printed metal object" refers to an intermediate part with a shape representative of the final 3D printed part and that includes metallic build material bound together as a result of i) weak sintering (i.e., low level necking between the particles, which is able to preserve the part shape), and/or ii) binding of the dehydrated metal salt with the metallic build material. In some examples, the "at least substantially hydrated metal salt free 3D printed metal object" is the same as the "3D printed metal object."

As used herein, the term "metallic part" refers to the 3D printed metal object or the at least substantially hydrated metal salt free 3D printed metal object after having been subjected to a sintering temperature for at least a few minutes.

As used herein, the terms "3D printed part," "3D part," "part," "3D printed object," "3D object," or "object" may be a completed 3D printed part or a layer of a 3D printed part.

As used herein, the terms "hydrated metal salt," "metal salt," "hydrated salt," or "salt" are used interchangeably generally or specifically to refer to a metal salt that is hydrated.

As used herein, "(s)" at the end of some terms indicates that those terms/phrases may be singular in some examples or plural in some examples. It is to be understood that the terms without "(s)" may be also be used singularly or plurally in many examples.

Described herein, in some examples, is a method of forming a 3D printed metal object comprising:

(A) depositing a build material comprising at least one metal;

(B) selectively jetting a fusing agent on the build material, the fusing agent comprising:
  (i) at least one hydrated metal salt having a dehydration temperature of from about 100° C. to about 250° C., and
  (ii) a carrier liquid comprising at least one surfactant and water;

(C) heating the build material and the selectively jetted fusing agent to a temperature of from about 100° C. to about 250° C. to:
  (a) remove the carrier liquid,
  (b) dehydrate the hydrated metal salt, and
  (c) bind the build material and the selectively jetted fusing agent; and (D) repeating (A), (B), and (C) at least one time to form the 3D printed metal object.

In some examples, described herein is a method of forming a 3D printed metal object comprising:

(A) depositing a build material comprising at least one metal;

(B) selectively jetting a fusing agent on the build material, the fusing agent comprising:
  (i) at least one hydrated metal salt having a dehydration temperature of from about 100° C. to about 250° C., and
  (ii) a carrier liquid comprising at least one surfactant and water;

(C) repeating (A) and (B); and (D) heating the build material and the selectively jetted fusing agent to a temperature of from about 100° C. to about 250° C. to:
  (a) remove the carrier liquid,
  (b) dehydrate the hydrated metal salt, and
  (c) bind the build material and the selectively jetted fusing agent; at least one time to form the 3D printed metal object.

In some examples, the dehydration temperature is from about 100° C. to about 240° C., or from about 100° C. to about 230° C., or from about 100° C. to about 220° C., or from about 100° C. to about 210° C., or from about 100° C. to about 200° C., or from about 100° C. to about 190° C., or from about 100° C. to about 180° C., or from about 100° C. to about 170° C., or from about 100° C. to about 160° C., or from about 100° C. to about 150° C., or from about 100° C. to about 140° C., or from about 100° C. to about 130° C., or from about 100° C. to about 120° C., or from about 100° C. to about 110° C., or more than about 100° C., or more than about 110° C., or more than about 120° C., or more than about 130° C., or more than about 140° C., or more than about 150° C., or more than about 160° C., or more than about 170° C., or more than about 180° C., or more than about 190° C., or more than about 200° C., or more than about 210° C., or more than about 220° C., or more than about 230° C., or more than about 240° C., or less than about 250° C., or less than about 240° C., or less than about 230° C., or less than about 220° C., or less than about 210° C., or less than about 200° C., or less than about 190° C., or less than about 180° C., less than about 170° C., or less than about 160° C., or less than about 150° C., or less than about 140° C., or less than about 130° C., or less than about 120° C., or less than about 110° C.

In some examples, the method of forming a 3D printed metal object can further comprise: (E) heating the 3D printed metal object to a sintering temperature to form a metallic part.

In some examples, the method of forming a 3D printed metal object can further comprise: forming a corresponding metal oxide of the hydrated metal salt after dehydrating the hydrated metal salt in (C)(b); and/or forming a corresponding metal of the hydrated metal salt after dehydrating the hydrated metal salt in (C)(b).

In some examples, the at least one hydrated metal salt comprises: at least one metal cation selected from the group consisting of aluminum, magnesium, copper, zinc, iron, nickel, manganese, cobalt, molybdenum, chromium, tin, vanadium, and combinations thereof; and at least one anion selected from the group consisting of hydroxide, carbonate, sulfate, nitrate, acetate, formate, borate, chloride, bromide, and combinations thereof.

In some examples, the at least one hydrated metal salt is selected from the group consisting of hydrated copper nitrate, hydrated iron nitrate, hydrated nickel nitrate, hydrated manganese nitrate, hydrated cobalt nitrate, hydrated iron acetate, and combinations thereof.

In some examples, the at least one metal in the build material is the same as the metal cation in the at least one hydrated metal salt.

In some examples, the at least one hydrated metal salt is present in the fusing agent in an amount of from about 5 wt % to about 50 wt % based on the total weight of the fusing agent, or from about 10 wt % to about 50 wt % based on the total weight of the fusing agent, or from about 15 wt % to about 50 wt % based on the total weight of the fusing agent, or from about 20 wt % to about 50 wt % based on the total weight of the fusing agent, or from about 25 wt % to about 50 wt % based on the total weight of the fusing agent, or from about 30 wt % to about 50 wt % based on the total weight of the fusing agent, or from about 35 wt % to about 50 wt % based on the total weight of the fusing agent, or from about 40 wt % to about 50 wt % based on the total weight of the fusing agent, or from about 45 wt % to about 50 wt % based on the total weight of the fusing agent, or less than about 50 wt % based on the total weight of the fusing agent, or less than about 45 wt % based on the total weight of the fusing agent, or less than about 40 wt % based on the total weight of the fusing agent, or less than about 35 wt % based on the total weight of the fusing agent, or less than about 30 wt % based on the total weight of the fusing agent, or less than about 25 wt % based on the total weight of the fusing agent, or less than about 20 wt % based on the total weight of the fusing agent, or less than about 15 wt % based on the total weight of the fusing agent, or less than about 10 wt % based on the total weight of the fusing agent.

In some examples, the 3D printed metal object has a fracture strength of from about 5 MPa to about 20 MPa, or from about 10 MPa to about 20 MPa, or from about 15 MPa to about 20 MPa, or less than about 20 MPa, or less than about 15 MPa, or less than about 10 MPa, or less than about 5 MPa, or at least 5 MPa, or at least 10 MPa, or at least 15 MPa, or at least 20 MPa.

In some examples, the 3D printed metal object comprises the dehydrated metal salt and the corresponding metal oxide.

In some examples, the dehydrated metal salt is present in the 3D printed metal object in an amount of from about 0.2 wt % to about 20 wt % based on the total weight of the 3D printed metal object, or from about 0.2 wt % to about 15 wt % based on the total weight of the 3D printed metal object, or from about 0.2 wt % to about 10 wt % based on the total weight of the 3D printed metal object, or from about 0.2 wt % to about 5 wt % based on the total weight of the 3D printed metal object, or from about 0.2 wt % to about 1 wt % based on the total weight of the 3D printed metal object, or less than about 20 wt % based on the total weight of the 3D printed metal object, or less than about 15 wt % based on the total weight of the 3D printed metal object, or less than about 10 wt % based on the total weight of the 3D printed metal object, or less than about 5 wt % based on the total weight of the 3D printed metal object, or less than about 1 wt % based on the total weight of the 3D printed metal object, or less than about 0.5 wt % based on the total weight of the 3D printed metal object, or less than about 0.02 wt % based on the total weight of the 3D printed metal object, or about 0 wt % based on the total weight of the 3D printed metal object.

In some examples, the corresponding metal oxide is present in the 3D printed metal object in an amount of from about 0 wt % to about 10 wt % based on the total weight of the 3D printed metal object, or from about 0 wt % to about 5 wt % based on the total weight of the 3D printed metal object, or from about 0 wt % to about 1 wt % based on the total weight of the 3D printed metal object, or less than about 10 wt % based on the total weight of the 3D printed metal object, or less than about 5 wt % based on the total weight of the 3D printed metal object, or less than about 1 wt % based on the total weight of the 3D printed metal object, or less than about 0.1 wt % based on the total weight of the 3D printed metal object, or about 0 wt % based on the total weight of the 3D printed metal object.

In some examples, the 3D printed metal object is substantially free from the hydrated metal salt.

In some examples, the sintering temperature is from about 450° C. to about 1500° C., or from about 500° C. to about 1500° C., or from about 600° C. to about 1500° C., or from about 700° C. to about 1500° C., or from about 800° C. to about 1500° C., or from about 900° C. to about 1500° C., or from about 1000° C. to about 1500° C., or from about 1100° C. to about 1500° C., or from about 1200° C. to about 1500° C., or from about 1300° C. to about 1500° C., or from about 1400° C. to about 1500° C., or less than about 2500° C., or less than about 2000° C., or less than about 1500° C., or less than about 1000° C., or less than about 900° C., or less than about 800° C., or less than about 700° C., or less than about 600° C., or less than about 500° C., or at least about 500° C., or at least about 1000° C., or at least about 1500° C., or at least about 2000° C., or at least about 2500° C.

In some examples, the heating of the three-dimensional object to the sintering temperature is performed for a sintering time period ranging from about 10 minutes to about 20 hours, or at least 10 minutes, or at least 1 hour, or at least 8 hours, or at least 10 hours, or at least 15 hours, or at least 20 hours.

In some examples, (E) occurs in an environment containing (i) a vacuum or (ii) an inert gas, a low reactivity gas, a reducing gas, or a combination thereof. The inert gas, low reactivity gas, and reducing gas can include but are not limited to helium, argon, neon, xenon, krypton, nitrogen, hydrogen, carbon monoxide and combinations thereof.

In some examples, disclosed herein is a composition for 3D printing comprising: a build material comprising at least one metal; and a fusing agent comprising (i) at least one hydrated metal salt having a dehydration temperature of from about 100° C. to about 250° C., and (ii) a carrier liquid comprising at least one surfactant and water, wherein the at least one hydrated metal salt is present in an amount of at least 5 wt % in the fusing agent based on the total weight of the fusing agent, and wherein the at least one hydrated metal salt comprises: at least one metal cation selected from the group consisting of aluminum, magnesium, copper, zinc, iron, nickel, manganese, cobalt, molybdenum, chromium, tin, vanadium, and combinations thereof; and at least one anion selected from the group consisting of hydroxide, carbonate, sulfate, nitrate, acetate, formate, borate, chloride, bromide, and combinations thereof.

In some examples, the at least one hydrated metal salt is present in the fusing agent in an amount of from about 5 wt % to about 50 wt % based on the total weight of the fusing agent, or from about 10 wt % to about 50 wt % based on the total weight of the fusing agent, or from about 15 wt % to about 50 wt % based on the total weight of the fusing agent, or from about 20 wt % to about 50 wt % based on the total weight of the fusing agent, or from about 25 wt % to about 50 wt % based on the total weight of the fusing agent, or from about 30 wt % to about 50 wt % based on the total weight of the fusing agent, or from about 35 wt % to about 50 wt % based on the total weight of the fusing agent, or from about 40 wt % to about 50 wt % based on the total weight of the fusing agent, or from about 45 wt % to about 50 wt % based on the total weight of the fusing agent, or less than about 50 wt % based on the total weight of the fusing agent, or less than about 45 wt % based on the total weight of the fusing agent, or less than about 40 wt % based on the total weight of the fusing agent, or less than about 35 wt % based on the total weight of the fusing agent, or less than about 30 wt % based on the total weight of the fusing agent, or less than about 25 wt % based on the total weight of the fusing agent, or less than about 20 wt % based on the total weight of the fusing agent, or less than about 15 wt % based on the total weight of the fusing agent, or less than about 10 wt % based on the total weight of the fusing agent.

In some examples, the dehydration temperature is from about 100° C. to about 240° C., or from about 100° C. to about 230° C., or from about 100° C. to about 220° C., or from about 100° C. to about 210° C., or from about 100° C. to about 200° C., or from about 100° C. to about 190° C., or from about 100° C. to about 180° C., or from about 100° C. to about 170° C., or from about 100° C. to about 160° C., or from about 100° C. to about 150° C., or from about 100° C. to about 140° C., or from about 100° C. to about 130° C., or from about 100° C. to about 120° C., or from about 100° C. to about 110° C., or more than about 100° C., or more than about 110° C., or more than about 120° C., or more than about 130° C., or more than about 140° C., or more than about 150° C., or more than about 160° C., or more than about 170° C., or more than about 180° C., or more than about 190° C., or more than about 200° C., or more than about 210° C., or more than about 220° C., or more than about 230° C., or more than about 240° C., or less than about 250° C., or less than about 240° C., or less than about 230° C., or less than about 220° C., or less than about 210° C., or less than about 200° C., or less than about 190° C., or less than about 180° C., less than about 170° C., or less than about 160° C., or less than about 150° C., or less than about 140° C., or less than about 130° C., or less than about 120° C., or less than about 110° C.

Turning now to the figures:

Referring now to FIG. 1, an example of a 3D printing system 10 is depicted. It is to be understood that the 3D printing system 10 may include additional components and that some of the components described herein may be removed and/or modified. Furthermore, components of the 3D printing system 10 depicted in FIG. 1 may not be drawn to scale and thus, the 3D printing system 10 may have a different size and/or configuration other than as shown therein.

The three-dimensional (3D) printing system 10 generally includes a supply 14 of metallic build material 16; a build material distributor 18; a supply of a fusing agent 36, the fusing agent 36 including a liquid vehicle and hydrated metal salt dispersed in the liquid vehicle; an inkjet applicator 24 for selectively dispensing the fusing agent 36 (FIG. 2C); at least one heat source 32, 32'; a controller 28; and a non-transitory computer readable medium having stored thereon computer executable instructions to cause the controller 28 to: utilize the build material distributor 18 and the inkjet applicator 24 to iteratively form multiple layers 34 (FIG. 2B) of metallic build material 16 which are applied by the build material distributor 18 and have received the fusing agent 36, thereby creating a patterned 3D printed metal object 42' (FIG. 2E), and utilize the at least one heat source 32, 32' to heat 46 the patterned 3D printed metal object 42' to about a dehydration temperature of the hydrated metal salt thereby affecting binding of the metallic build material particles 16 by creating a 3D printed metal object 42', continue heating the patterned 3D printed metal object 42' to the dehydration temperature of the hydrated metal salt, thereby creating an at least substantially hydrated metal salt free 3D printed metal object 42, and heat 52 the at least substantially hydrated metal salt free 3D printed metal object 42 to a sintering temperature to form a metallic part 50.

In some examples, depending on the heating temperatures and choice of hydrated metal salt, the hydrated metal salt can be dehydrated, then decomposed to the corresponding metal oxide, and then decomposed to the corresponding metal all prior to heating to a sintering temperature. In some examples, decomposition to the corresponding metal oxide and then the corresponding metal can occur during sintering. In some examples, a portion of decomposition to the corresponding metal oxide and then the corresponding metal can occur during sintering.

As shown in FIG. 1, the printing system 10 includes a build area platform 12, the build material supply 14 containing metallic build material particles 16, and the build material distributor 18.

The build area platform 12 receives the metallic build material 16 from the build material supply 14. The build area platform 12 may be integrated with the printing system 10 or may be a component that is separately insertable into the printing system 10. For example, the build area platform 12 may be a module that is available separately from the printing system 10. The build area platform 12 that is shown is also one example, and could be replaced with another support member, such as a platen, a fabrication/print bed, a glass plate, or another build surface.

Figure 2A:
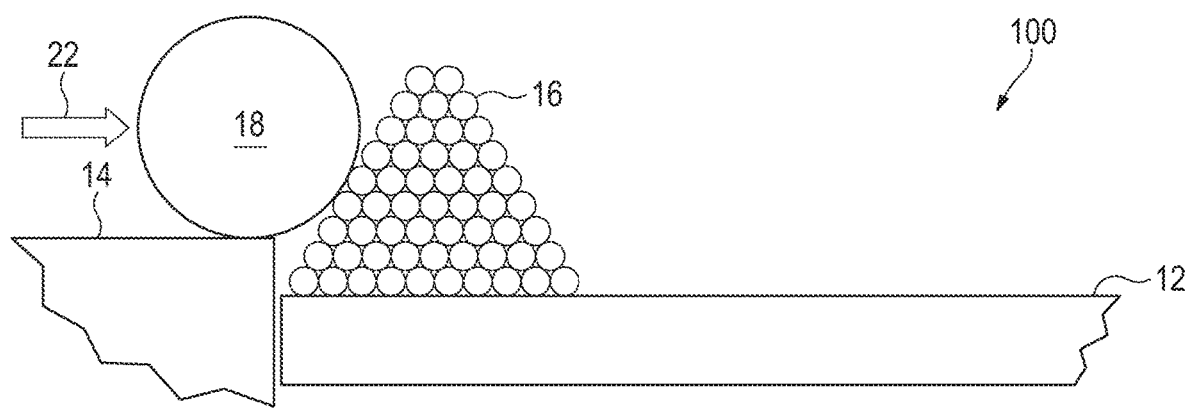
FIGS. 2A through 2F are schematic views depicting the formation of a patterned 3D printed metal object, a 3D printed metal object, an at least substantially metal salt free 3D printed metal object, and a 3D metallic part using examples of a 3D printing method disclosed herein.
Figure 2B:
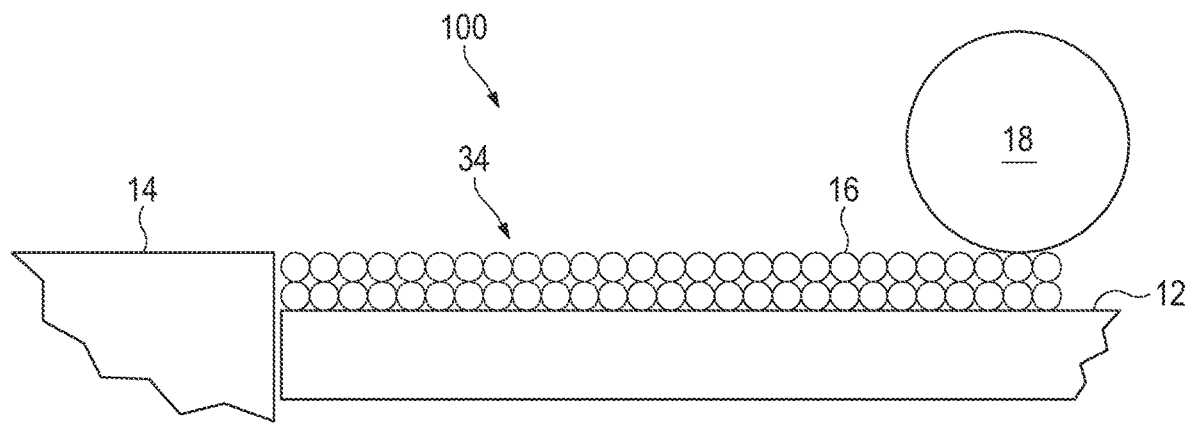
Figure 2C:
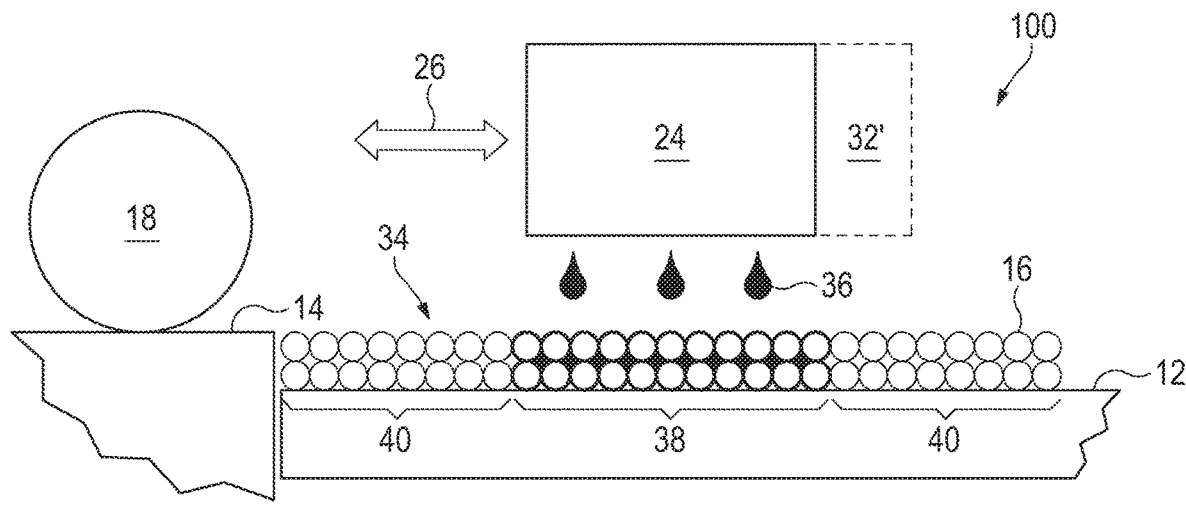
Figure 2D:
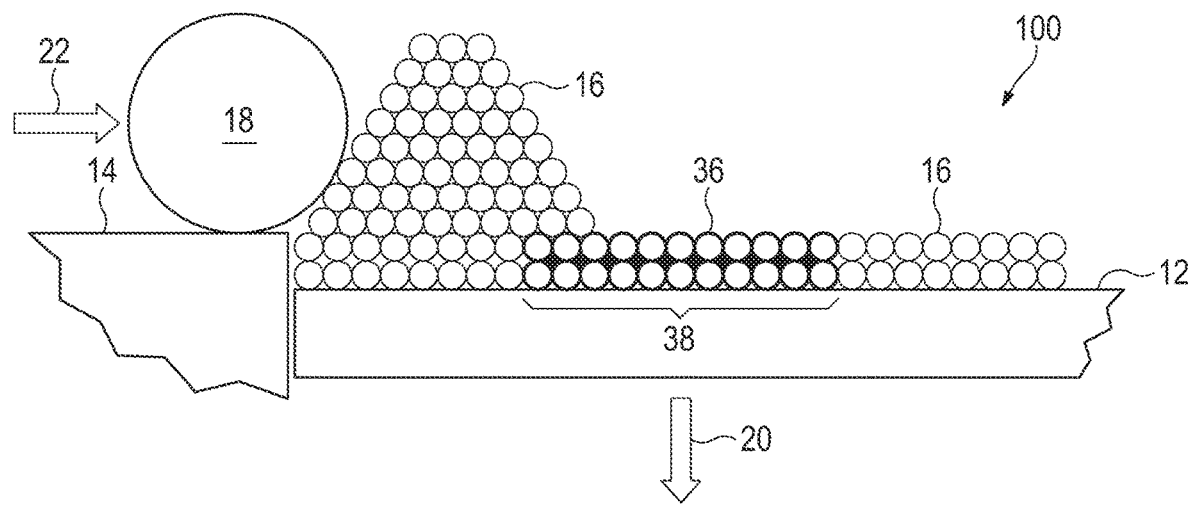

The build area platform 12 may be moved in a direction as denoted by the arrow 20, e.g., along the z-axis, so that metallic build material 16 may be delivered to the platform 12 or to a previously formed layer of metallic build material 16 (see FIG. 2D). In an example, when the metallic build material particles 16 are to be delivered, the build area platform 12 may be programmed to advance (e.g., downward) enough so that the build material distributor 18 can push the metallic build material particles 16 onto the platform 12 to form a layer 34 of the metallic build material 16 thereon (see, e.g., FIGS. 2A and 2B). The build area platform 12 may also be returned to its original position, for example, when a new part is to be built.

The build material supply 14 may be a container, bed, or other surface that is to position the metallic build material particles 16 between the build material distributor 18 and the build area platform 12. In some examples, the build material supply 14 may include a surface upon which the metallic build material particles 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to move the metallic build material particles 16 from a storage location to a position to be spread onto the build area platform 12 or onto a previously formed layer of metallic build material 16.

The build material distributor 18 may be moved in a direction as denoted by the arrow 22, e.g., along the y-axis, over the build material supply 14 and across the build area platform 12 to spread a layer of the metallic build material 16 over the build area platform 12. The build material distributor 18 may also be returned to a position adjacent to the build material supply 14 following the spreading of the metallic build material 16. The build material distributor 18 may be a blade (e.g., a doctor blade), a roller, a combination of a roller and a blade, and/or any other device capable of spreading the metallic build material particles 16 over the build area platform 12. For instance, the build material distributor 18 may be a counter-rotating roller.

The metallic build material 16 may be any particulate metallic material. In an example, the metallic build material 16 may be a powder. In another example, the metallic build material 16 may have the ability to sinter into a continuous body to form the metallic part 50 (see, e.g., FIG. 2F) when heated 52 to the sintering temperature (e.g., a temperature ranging from about 850° C. to about 1400° C.). In some examples, discrete metallic build material 16 powder particles should no longer be visible in the metallic part 50 (FIG. 2F). After sintering the powder particles and metal from the metal salt merge together to form a dense solid metallic part.

By "continuous body," it is meant that the metallic build material particles are merged together with the corresponding metal from the metal salt to form a single part with little or no porosity and with sufficient mechanical strength to meet target properties of the final metallic part 50.

While an example sintering temperature range is described, it is to be understood that this temperature may vary, depending, in part, upon the composition and phase(s) of the metallic build material 16.

In an example, the metallic build material 16 is a single phase metallic material composed of one element. In this example, the sintering temperature may be below the melting point of the single element.

In another example, the metallic build material 16 is composed of two or more elements, which may be in the form of a single phase metallic alloy or a multiple phase metallic alloy. In these other examples, melting generally occurs over a range of temperatures. For some single phase metallic alloys, melting begins just above the solidus temperature (where melting is initiated) and is not complete until the liquidus temperature (temperature at which all the solid has melted) is exceeded. For other single phase metallic alloys, melting begins just above the peritectic temperature. The peritectic temperature is defined by the point where a single phase solid transforms into a two phase solid plus liquid mixture, where the solid above the peritectic temperature is of a different phase than the solid below the peritectic temperature. When the metallic build material 16 is composed of two or more phases (e.g., a multiphase alloy made of two or more elements), melting generally begins when the eutectic or peritectic temperature is exceeded. The eutectic temperature is defined by the temperature at which a single phase liquid completely solidifies into a two phase solid. Generally, melting of the single phase metallic alloy or the multiple phase metallic alloy begins just above the solidus, eutectic, or peritectic temperature and is not complete until the liquidus temperature is exceeded. In some examples, sintering can occur below the solidus temperature, the peritectic temperature, or the eutectic temperature. In other examples, sintering occurs above the solidus temperature, the peritectic temperature, or the eutectic temperature. Sintering above the solidus temperature is known as super solidus sintering, and this technique may be useful when utilizing larger build material particles and/or to achieve high density. It is to be understood that the sintering temperature may be high enough to offer sufficient energy to allow atom mobility between adjacent particles.

Single elements or alloys may be used as the metallic build material 16. Some examples of the metallic build material 16 include steels, stainless steel, bronzes, brasses, titanium (Ti) and alloys thereof, aluminum (Al) and alloys thereof, nickel (Ni) and alloys thereof, cobalt (Co) and alloys thereof, iron (Fe) and alloys thereof, gold (Au) and alloys thereof, silver (Ag) and alloys thereof, platinum (Pt) and alloys thereof, and copper (Cu) and alloys thereof. Some specific examples include AlSi10Mg, 2xxx series aluminum, 4xxx series aluminum, CoCr MP1, CoCr SP2, Maraging-Steel MS1, Hastelloy C, Hastelloy X, NickelAlloy HX, Inconel IN625, Inconel IN718, SS GP1, SS 17-4PH, SS 316L, Ti6Al4V, and Ti-6Al-4V ELI7. While several example alloys have been described, it is to be understood that other alloy build materials may be used, such as refractory metals.

Any metallic build material 16 may be used that is in powder form at the outset of the 3D printing method(s) disclosed herein. As such, the melting point, solidus temperature, eutectic temperature, and/or peritectic temperature of the metallic build material 16 may be above the temperature of the environment in which the patterning portion of the 3D printing method is performed (e.g., above 80° C.). In some examples, the metallic build material 16 may have a melting point ranging from about 850° C. to about 3500° C. In other examples, the metallic build material 16 may be an alloy having a range of melting points. Alloys may include metals with melting points as low as 30° C. (e.g., gallium) or 157° C. (indium).

The metallic build material 16 may be made up of similarly sized particles or differently sized particles. In some examples, the metallic build material 16 has an average particle size of from about 5 to about 20 microns.

In the examples shown herein (FIG. 1 and FIGS. 2A-2F), the metallic build material 16 includes similarly sized particles (e.g., from about 5 to about 20 microns). The term "size", as used herein with regard to the metallic build material 16, refers to the diameter of a substantially spherical particle (i.e., a spherical or near-spherical particle having a sphericity of >0.84), or the average diameter of a non-spherical particle (i.e., the average of multiple diameters across the particle).

In some examples, substantially spherical particles of a particle size of from about 5 microns to about 20 microns have good flowability and can be spread relatively easily. As an example, the average particle size of the particles of the metallic build material 16 may range from about 1 μm to about 200 μm. As another example, the average size of the particles of the metallic build material 16 ranges from about 10 μm to about 100 μm. As still another example, the average size of the particles of the metallic build material 16 ranges from 15 μm to about 50 μm.

As shown in FIG. 1, the printing system 10 also includes an applicator 24, which may contain the fusing agent 36 (shown in FIG. 2C) disclosed herein.

The fusing agent 36 includes at least the liquid vehicle and the hydrated metal salt. In some instances, the fusing agent 36 consists of the liquid vehicle and the hydrated metal salt, without any other components.

The hydrated metal salt is a sacrificial intermediate binder in that it is present in various stages of the 3D printed metal object 42, 42' (shown in FIG. 2E) that is formed, and then is ultimately removed (through thermal decomposition) from the 3D printed metal object 42', and thus is not present in the final metallic part 50 (shown in FIG. 2F).

In the examples disclosed herein, the hydrated metal salt may be dispersed in the liquid vehicle. In some examples, the hydrated metal salt can be selected from the group consisting of hydrated copper nitrate, hydrated iron nitrate, hydrated nickel nitrate, hydrated manganese nitrate, hydrated cobalt nitrate, hydrated iron acetate, and combinations thereof.

In some examples, the fusing agent 36 can include a coalescing solvent in addition to the hydrated metal salt. In these examples, the coalescing solvent dissolves and disperses the hydrated metal salt. In some examples, the fusing agent 36 may consist of the hydrated metal salt and the coalescing solvent (with no other components). In these examples, the liquid vehicle consists of the coalescing solvent (with no other components), and the coalescing solvent makes up the balance of the fusing agent 36.

In some examples, the coalescing solvent may be a lactone, such as 2-pyrrolidinone or 1-(2-hydroxyethyl)-2-pyrrolidone. In other examples, the coalescing solvent may be a glycol ether or a glycol ether esters, such as tripropylene glycol mono methyl ether, dipropylene glycol mono methyl ether, dipropylene glycol mono propyl ether, tripropylene glycol mono n-butyl ether, propylene glycol phenyl ether, dipropylene glycol methyl ether acetate, diethylene glycol mono butyl ether, diethylene glycol mono hexyl ether, ethylene glycol phenyl ether, diethylene glycol mono n-butyl ether acetate, ethylene glycol mono n-butyl ether acetate, or combinations thereof. In still other examples, the coalescing solvent may be a water-soluble polyhydric alcohol, such as 2-methyl-1,3-propanediol. In still other examples, the coalescing solvent may be a combination of any of the examples above. In still other examples, the coalescing solvent is selected from the group consisting of 2-pyrrolidinone, 1-(2-hydroxyethyl)-2-pyrrolidone, tripropylene glycol mono methyl ether, dipropylene glycol mono methyl ether, dipropylene glycol mono propyl ether, tripropylene glycol mono n-butyl ether, propylene glycol phenyl ether, dipropylene glycol methyl ether acetate, diethylene glycol mono butyl ether, diethylene glycol mono hexyl ether, ethylene glycol phenyl ether, diethylene glycol mono n-butyl ether acetate, ethylene glycol mono n-butyl ether acetate, 2-methyl-1,3-propanediol, and a combination thereof.

The coalescing solvent may be present in the fusing agent 36 in an amount ranging from about 0.1 wt % to about 70 wt % (based upon the total wt % of the fusing agent 36). In some examples, greater or lesser amounts of the coalescing solvent may be used depending, in part, upon the jetting architecture of the applicator 24.

In some examples, the at least one hydrated metal salt is present in the fusing agent in an amount of from about 5 wt % to about 50 wt % based on the total weight of the fusing agent, or from about 10 wt % to about 50 wt % based on the total weight of the fusing agent, or from about 15 wt % to about 50 wt % based on the total weight of the fusing agent, or from about 20 wt % to about 50 wt % based on the total weight of the fusing agent, or from about 25 wt % to about 50 wt % based on the total weight of the fusing agent, or from about 30 wt % to about 50 wt % based on the total weight of the fusing agent, or from about 35 wt % to about 50 wt % based on the total weight of the fusing agent, or from about 40 wt % to about 50 wt % based on the total weight of the fusing agent, or from about 45 wt % to about 50 wt % based on the total weight of the fusing agent, or less than about 50 wt % based on the total weight of the fusing agent, or less than about 45 wt % based on the total weight of the fusing agent, or less than about 40 wt % based on the total weight of the fusing agent, or less than about 35 wt % based on the total weight of the fusing agent, or less than about 30 wt % based on the total weight of the fusing agent, or less than about 25 wt % based on the total weight of the fusing agent, or less than about 20 wt % based on the total weight of the fusing agent, or less than about 15 wt % based on the total weight of the fusing agent, or less than about 10 wt % based on the total weight of the fusing agent.

As mentioned above, the fusing agent 36 includes the hydrated metal salt and the liquid vehicle. As used herein, "liquid vehicle" may refer to the liquid fluid in which the hydrated metal salt is dispersed to form the fusing agent 36. A wide variety of liquid vehicles, including aqueous and non-aqueous vehicles, may be used with the fusing agent 36. In some instances, the liquid vehicle consists of a primary solvent with no other components. In other examples, the fusing agent 36 may include other ingredients, depending, in part, upon the applicator 24 that is to be used to dispense the fusing agent 36.

Examples of other suitable fusing agent components include co-solvent(s), surfactant(s), antimicrobial agent(s), anti-kogation agent(s), viscosity modifier(s), pH adjuster(s) and/or sequestering agent(s). The presence of a co-solvent and/or a surfactant in the fusing agent 36 may assist in obtaining a particular wetting behavior with the metallic build material 16.

The primary solvent may be water or a non-aqueous solvent (e.g., ethanol, acetone, n-methyl pyrrolidone, aliphatic hydrocarbons, or combinations thereof). In some examples, the fusing agent 36 consists of the hydrated metal salt and the primary solvent (with no other components). In these examples, the primary solvent makes up the balance of the fusing agent 36.

Classes of organic co-solvents that may be used in the water-based fusing agent 36 include aliphatic alcohols, aromatic alcohols, diols, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs (C6-C12) of polyethylene glycol alkyl ethers, N-alkyl caprolactams, unsubstituted caprolactams, both substituted and unsubstituted formamides, both substituted and unsubstituted acetamides, and the like.

Examples of some suitable co-solvents include water-soluble high-boiling point solvents (i.e., humectants), which have a boiling point of at least 120° C., or higher. Some examples of high-boiling point solvents include 2-pyrrolidone (boiling point of about 245° C.), 2-methyl-1,3-propanediol (boiling point of about 212° C.), and combinations thereof. The co-solvent(s) may be present in the fusing agent 36 in a total amount ranging from about 1 wt % to about 70 wt % based upon the total wt % of the fusing agent 36, depending upon the jetting architecture of the applicator 24.

Surfactant(s) may be used to improve the wetting properties and the jettability of the fusing agent 36. In some examples, the surfactant can be Dowfax™ 2A1. Examples of suitable surfactants include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6 or TERGITOL™ 15-S-7 from The Dow Chemical Company). In some examples, it may be useful to utilize a surfactant having a hydrophilic-lipophilic balance (HLB) less than 10.

Whether a single surfactant is used or a combination of surfactants is used, the total amount of surfactant(s) in the fusing agent 36 may range from about 0.01 wt % to about 10 wt % based on the total wt % of the fusing agent 36. In another example, the total amount of surfactant(s) in the fusing agent 36 may range from about 0.5 wt % to about 2.5 wt % based on the total wt % of the fusing agent 36.

The liquid vehicle may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® M20 (Thor), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., Bardac® 2250 and 2280, Barquat® 50-65B, and Carboquat® 250-T, all from Lonza Ltd. Corp.), and an aqueous solution of methylisothiazolone (e.g., Kordek® MLX from Dow Chemical Co.). The biocide or antimicrobial may be added in any amount ranging from about 0.05 wt % to about 0.5 wt % (as indicated by regulatory usage levels) with respect to the total wt % of the fusing agent 36.

An anti-kogation agent may be included in the fusing agent 36. Kogation refers to the deposit of dried ink (e.g., fusing agent 36) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol). Whether a single anti-kogation agent is used or a combination of anti-kogation agents is used, the total amount of anti-kogation agent(s) in the fusing agent 36 may range from greater than 0.20 wt % to about 0.62 wt % based on the total wt % of the fusing agent 36. In an example, the oleth-3-phosphate is included in an amount ranging from about 0.20 wt % to about 0.60 wt %, and the low molecular weight polyacrylic acid polymer is included in an amount ranging from about 0.005 wt % to about 0.03 wt %.

Sequestering agents, such as EDTA (ethylene diamine tetra acetic acid), may be included to eliminate the deleterious effects of heavy metal impurities, and buffer solutions may be used to control the pH of the fusing agent 36. From 0.01 wt % to 2 wt % of each of these components, for example, can be used. Viscosity modifiers and buffers may also be present, as well as other known additives to modify properties of the fusing agent 36. Such additives can be present in amounts ranging from about 0.01 wt % to about 20 wt %.

The applicator 24 may be scanned across the build area platform 12 in the direction indicated by the arrow 26, e.g., along the y-axis. The applicator 24 may be, for instance, an inkjet applicator, such as a thermal inkjet printhead, a piezoelectric printhead, or a continuous inkjet printhead, and may extend a width of the build area platform 12. While the applicator 24 is shown in FIG. 1 as a single applicator, it is to be understood that the applicator 24 may include multiple applicators that span the width of the build area platform 12. Additionally, the applicators 24 may be positioned in multiple printbars. The applicator 24 may also be scanned along the x-axis, for instance, in configurations in which the applicator 24 does not span the width of the build area platform 12 to enable the applicator 24 to deposit the fusing agent 36 over a large area of a layer of the metallic build material 16. The applicator 24 may thus be attached to a moving XY stage or a translational carriage (neither of which is shown) that moves the applicator 24 adjacent to the build area platform 12 in order to deposit the fusing agent 36 in predetermined areas of a layer of the metallic build material 16 that has been formed on the build area platform 12 in accordance with the method(s) disclosed herein. The applicator 24 may include a plurality of nozzles (not shown) through which the fusing agent 36 is to be ejected.

The applicator 24 may deliver drops of the fusing agent 36 at a resolution ranging from about 300 dots per inch (DPI) to about 1200 DPI. In other examples, the applicator 24 may deliver drops of the fusing agent 36 at a higher or lower resolution. The drop velocity may range from about 2 m/s to about 24 m/s and the firing frequency may range from about 1 kHz to about 100 kHz. In one example, each drop may be in the order of about 10 picoliters (pl) per drop, although it is contemplated that a higher or lower drop size may be used. For example, the drop size may range from about 1 pl to about 400 pl. In some examples, applicator 24 is able to deliver variable size drops of the fusing agent 36.

Each of the previously described physical elements may be operatively connected to a controller 28 of the printing system 10. The controller 28 may control the operations of the build area platform 12, the build material supply 14, the build material distributor 18, and the applicator 24. As an example, the controller 28 may control actuators (not shown) to control various operations of the 3D printing system 10 components. The controller 28 may be a computing device, a semiconductor-based microprocessor, a central processing unit (CPU), an application specific integrated circuit (ASIC), and/or another hardware device. Although not shown, the controller 28 may be connected to the 3D printing system 10 components via communication lines.

The controller 28 manipulates and transforms data, which may be represented as physical (electronic) quantities within the printer's registers and memories, in order to control the physical elements to create the metallic part 50. As such, the controller 28 is depicted as being in communication with a data store 30. The data store 30 may include data pertaining to a metallic part 50 to be printed by the 3D printing system 10. The data for the selective delivery of the metallic build material particles 16 and the fusing agent 36 may be derived from a model of the metallic part 50 to be formed. For instance, the data may include the locations on each layer of metallic build material particles 16 that the applicator 24 is to deposit the fusing agent 36. In one example, the controller 28 may use the data to control the applicator 24 to selectively apply the fusing agent 36. The data store 30 may also include machine readable instructions (stored on a non-transitory computer readable medium) that are to cause the controller 28 to control the amount of metallic build material particles 16 that is supplied by the build material supply 14, the movement of the build area platform 12, the movement of the build material distributor 18, or the movement of the applicator 24.

As shown in FIG. 1, the printing system 10 may also include a heater 32, 32'. In some examples, the heater 32 includes a conventional furnace or oven, a microwave, or devices capable of hybrid heating (i.e., conventional heating and microwave heating). This type of heater 32 may be used for heating the entire build material cake 44 (see FIG. 2E) after the printing is finished or for heating the patterned 3D printed metal object 42' (patterned 3D printed metal object and 3D printed metal object are used interchangeably for 42') or for heating the at least substantially hydrated metal salt free 3D printed metal object 42.

In some examples, patterning may take place in the printing system 10, and then the build material platform 12 with the patterned 3D printed metal object 42' thereon may be detached from the system 10 and placed into the heater 32 for the various heating stages. In other examples, the heater 32 may be a conductive heater or a radiative heater (e.g., infrared lamps) that is integrated into the system 10. These other types of heaters 32 may be placed below the build area platform 12 (e.g., conductive heating from below the platform 12) or may be placed above the build area platform 12 (e.g., radiative heating of the build material layer surface). Combinations of these types of heating may also be used. These other types of heaters 32 may be used throughout the 3D printing process. In still other examples, the heater 32' may be a radiative heat source (e.g., a curing lamp) that is positioned to heat each layer 34 (see FIG. 2C) after the fusing agent 36 has been applied thereto. In the example shown in FIG. 1, the heater 32' is attached to the side of the applicator 24, which allows for printing and heating in a single pass. In some examples, both the heater 32 and the heater 32' may be used.

Referring now to FIGS. 2A through 2F, an example of the 3D printing method 100 is depicted. Prior to execution of printing, the controller 28 may access data stored in the data store 30 pertaining to a metallic part 50 that is to be printed. The controller 28 may determine the number of layers of metallic build material particles 16 that are to be formed, and the locations at which fusing agent 36 from the applicator 24 is to be deposited on each of the respective layers.

In FIG. 2A, the build material supply 14 may supply the metallic build material particles 16 into a position so that they are ready to be spread onto the build area platform 12. In FIG. 2B, the build material distributor 18 may spread the supplied metallic build material particles 16 onto the build area platform 12. The controller 28 may execute control build material supply instructions to control the build material supply 14 to appropriately position the metallic build material particles 16, and may execute control spreader instructions to control the build material distributor 18 to spread the supplied metallic build material particles 16 over the build area platform 12 to form a layer 34 of metallic build material particles 16 thereon. As shown in FIG. 2B, one layer 34 of the metallic build material particles 16 has been applied.

The layer 34 has a substantially uniform thickness across the build area platform 12. In an example, the thickness of the layer 34 ranges from about 30 µm to about 300 µm, although thinner or thicker layers may also be used. For example, the thickness of the layer 34 may range from about 20 µm to about 500 µm. The layer thickness may be about 2× the particle diameter (as shown in FIG. 2B) at a minimum for finer part definition. In some examples, the layer thickness may be about 1.2× (i.e., 1.2 times) the particle diameter.

Referring now to FIG. 2C, selectively applying the fusing agent 36 on a portion 38 of the metallic build material 16 continues. As illustrated in FIG. 2C, the fusing agent 36 may be dispensed from the applicator 24. The applicator 24 may be a thermal inkjet printhead a piezoelectric printhead, or a continuous inkjet printhead, and the selectively applying of the fusing agent 36 may be accomplished by the associated inkjet printing technique. As such, the selectively applying of the fusing agent 36 may be accomplished by thermal inkjet printing or piezo electric inkjet printing.

The controller 28 may execute instructions to control the applicator 24 (e.g., in the directions indicated by the arrow 26) to deposit the fusing agent 36 onto predetermined portion(s) 38 of the metallic build material 16 that are to become part of a patterned 3D printed metal object 42' and are to ultimately be sintered to form the metallic part 50. The applicator 24 may be programmed to receive commands from the controller 28 and to deposit the fusing agent 36 according to a pattern of a cross-section for the layer of the metallic part 50 that is to be formed. As used herein, the cross-section of the layer of the metallic part 50 to be formed refers to the cross-section that is parallel to the surface of the build area platform 12. In the example shown in FIG. 2C, the applicator 24 selectively applies the fusing agent 36 on those portion(s) 38 of the layer 34 that are to be fused to become the first layer of the metallic part 50. As an example, if the 3D part that is to be formed is to be shaped like a cube or cylinder, the fusing agent 36 will be deposited in a square pattern or a circular pattern (from a top view), respectively, on at least a portion of the layer 34 of the metallic build material particles 16. In the example shown in FIG. 2C, the fusing agent 36 is deposited in a square pattern on the portion 38 of the layer 34 and not on the portions 40.

As mentioned above, the fusing agent 36 includes the hydrated metal salt and the liquid vehicle. As also mentioned above, in some examples the fusing agent 36 also includes the coalescing solvent (as or in addition to the liquid vehicle). It is to be understood that a single fusing agent 36 may be selectively applied to pattern the layer 34, or multiple fusing agents 36 may be selectively applied to pattern the layer 34.

While not shown, preparing the fusing agent 36 prior to selectively applying the fusing agent 36 can be carried out. Preparing the fusing agent 36 may include preparing the hydrated metal salt and then adding the hydrated metal salt to the liquid vehicle.

When the fusing agent 36 is selectively applied in the targeted portion(s) 38, the hydrated metal salt (present in the fusing agent 36) infiltrate the inter-particles spaces among the metallic build material particles 16. The volume of the fusing agent 36 that is applied per unit of metallic build material 16 in the patterned portion 38 may be sufficient to fill a major fraction, or most of the porosity existing within the thickness of the portion 38 of the layer 34.

It is to be understood that portions 40 of the metallic build material 16 that do not have the fusing agent 36 applied thereto also do not have the hydrated metal salt introduced thereto. As such, these portions do not become part of the patterned 3D printed metal object 42' that is ultimately formed.

Figure 2E:
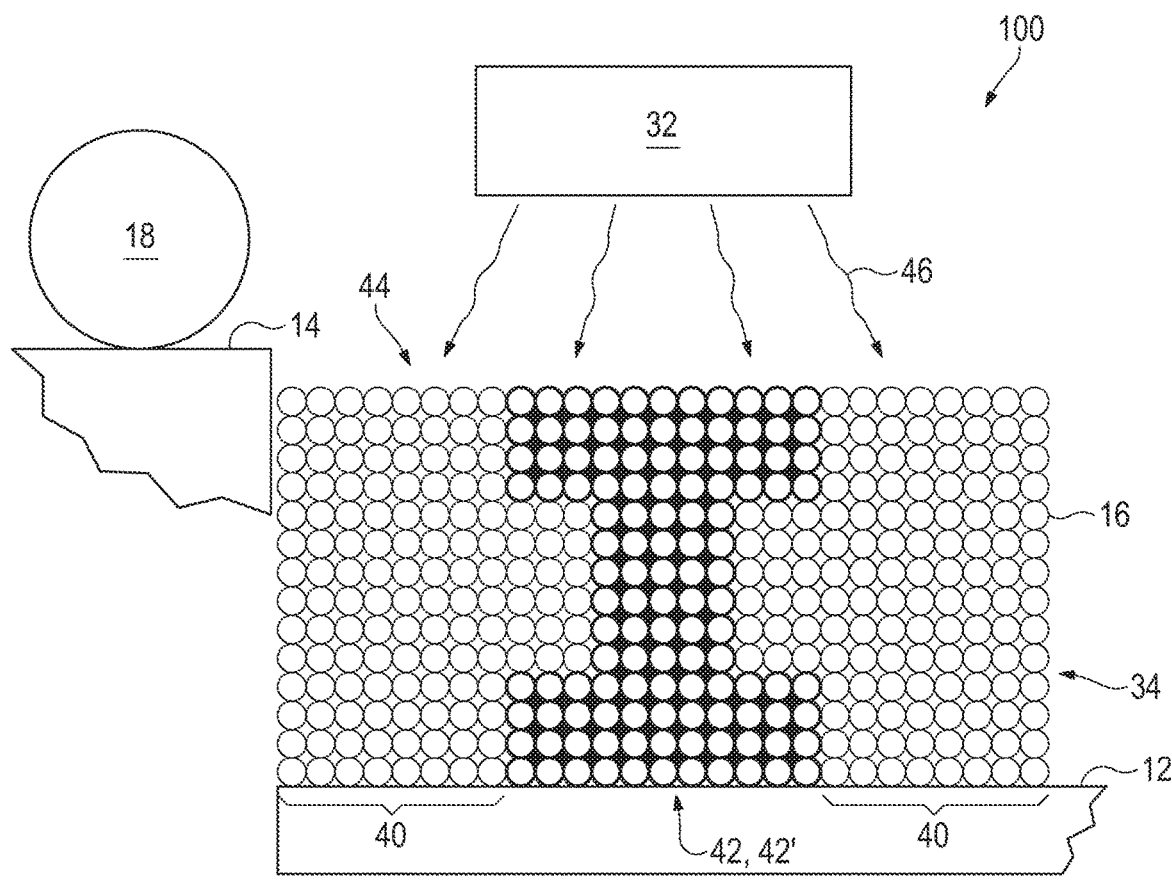
Figure 2F:
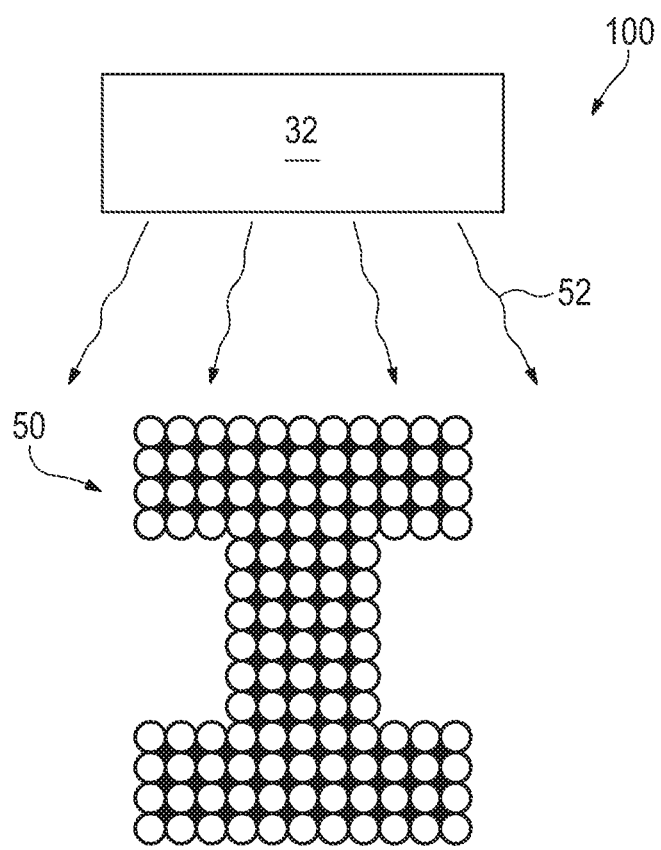

The processes shown in FIGS. 2A through 2C may be repeated to iteratively build up several patterned layers and to form the patterned 3D printed metal object 42' (see FIG. 2E).

FIG. 2D illustrates the initial formation of a second layer of metallic build material 16 on the layer 34 patterned with the fusing agent 36. In FIG. 2D, following deposition of the fusing agent 36 onto predetermined portion(s) 38 of the layer 34 of metallic build material 16, the controller 28 may execute instructions to cause the build area platform 12 to be moved a relatively small distance in the direction denoted by the arrow 20. In other words, the build area platform 12 may be lowered to enable the next layer of metallic build material 16 to be formed. For example, the build material platform 12 may be lowered a distance that is equivalent to the height of the layer 34. In addition, following the lowering of the build area platform 12, the controller 28 may control the build material supply 14 to supply additional metallic build material 16 (e.g., through operation of an elevator, an auger, or the like) and the build material distributor 18 to form another layer of metallic build material particles 16 on top of the previously formed layer 34 with the additional metallic build material 16. The newly formed layer may be patterned with fusing agent 36.

Referring back to FIG. 2C, the layer 34 may be exposed to heating using heater 32' after the fusing agent 36 is applied to the layer 34 and before another layer is formed. The heater 32' may be used for dehydrating the hydrated metal salt in the fusing agent 36 during printing layer-by-layer, and for producing a stabilized and 3D printed metal object layer. Heating to form the 3D printed metal object layer may take place at a temperature that is capable of dehydrating the hydrated metal salt in the fusing agent 36, but that is not capable of melting or sintering the metallic build material 16. In this example, the processes shown in FIGS. 2A through 2C (including the heating of the layer 34) may be repeated to iteratively build up several layers and to produce the 3D printed metal object 42'. The patterned 3D printed metal object 42' can then be exposed to the processes described in reference to FIG. 2F.

It will be understood that the heaters 32, 32' can be one or both or a combination of overhead lamp(s) and/or lamps attached to moving carriage(s) (not all options are shown in the figures).

The cycle time when printing layer-by-layer can range from about 5 seconds to about 100 seconds. During this time a layer of metallic build material 34 is formed, fusing agent 36 is delivered to the layer, and heaters 32, 32' heat the surface of the build material to a temperature that fuses the metallic build material by evaporating fluids from the agent and dehydrating the hydrated metal salt in the patterned 3D printed metal object 42'.

In some examples, layers of metallic build material 16 and fusing agent 36 can be heated layer-by-layer, every two layers, every three layers, or so forth, or once the build material cake 44 has been fully formed to then form the patterned 3D printed metal object 42' or the at least substantially hydrated metal salt free 3D printed metal object 42.

Repeatedly forming and patterning new layers (without curing each layer) results in the formation of a build material cake 44, as shown in FIG. 2E, which includes the patterned 3D printed metal object 42' residing within the non-patterned portions 40 of each of the layers 34 of metallic build material 16. The patterned 3D printed metal object 42' is a volume of the build material cake 44 that is filled with the metallic build material 16 and the fusing agent 36 within the inter-particle spaces. The remainder of the build material cake 44 is made up of the non-patterned metallic build material 16.

Also as shown in FIG. 2E, the build material cake 44 may be exposed to heat or radiation to generate heat, as denoted by the arrows 46. The heat applied may be sufficient to dehydrate the hydrated metal salt in the fusing agent 36 in the patterned 3D printed metal object 42' and to produce a stabilized and 3D printed metal object 42'. In one example, the heat source 32 may be used to apply the heat to the build material cake 44. In the example shown in FIG. 2E, the build material cake 44 may remain on the build area platform 12 while being heated by the heat source 32. In another example, the build area platform 12, with the build material cake 44 thereon, may be detached from the applicator 24 and placed in the heat source 32. Any of the previously described heat sources 32 and/or 32' may be used.

The dehydration temperature may depend, in part, on the choice of hydrated metal salt. In some examples, the dehydration temperature may range from about 100° C. to about 250° C.

In the example where the build material cake is exposed to heat or radiation to generate heat, the length of time at which the heat 46 is applied to the build material cake and the rate at which the patterned 3D printed metal object 42' is heated may be dependent, for example, on: characteristics of the heat or radiation source 32, 32', characteristics of the hydrated metal salt, characteristics of the metallic build material 16 (e.g., metal type or particle size), and/or the characteristics of the metallic part 50 (e.g., wall thickness). The patterned 3D printed metal object 42' may be heated at the dehydration temperature for a time period ranging from about 1 minute to about 360 minutes. In an example, this time period is about 30 minutes. In another example, this time period may range from about 2 minutes to about 240 minutes. The patterned 3D printed metal object 42' may be heated to the dehydration temperature at a rate of about 1° C./minute to about 10° C./minute, although it is contemplated that a slower or faster heating rate may be used. The heating rate may depend, in part, on: the fusing agent 36 used, the size (i.e., thickness and/or area (across the x-y plane)) of the layer 34 of metallic build material 16, and/or the characteristics of the metallic part 50 (e.g., size or wall thickness).

Heating to about the dehydration temperature of the hydrated metal salt causes the hydrated metal salt to form a corresponding dehydrated metal salt which can coalesce into a continuous dehydrated metal salt phase among the metallic build material particles 16 of the patterned 3D printed metal object 42. The continuous dehydrated metal salt phase may act as an adhesive between the metallic build material particles 16 to form the stabilized, the patterned 3D printed metal object 42' and/or the at least substantially hydrated metal salt free 3D printed metal object 42.

Heating to form the patterned 3D printed metal object 42' may also result in the evaporation of a significant fraction and in some instances all of the fluid from the patterned 3D printed metal object 42'. The evaporated fluid may include any of the fusing agent components. Fluid evaporation may result in some densification, through capillary action, of the 3D printed metal object 42'.

The stabilized, 3D printed metal object 42' exhibits handleable mechanical durability. The 3D printed metal object 42' may then be extracted from the build material cake 44. The 3D printed metal object 42' may be extracted by any suitable means. In an example, the 3D printed metal object 42' may be extracted by lifting the 3D printed metal object 42' from the unpatterned metallic build material particles 16. An extraction tool including a piston and a spring may be used.

When the 3D printed metal object 42' is extracted from the build material cake 44, the 3D printed metal object 42' may be removed from the build area platform 12 and placed in a heating mechanism. The heating mechanism may be the heater 32.

While not being bound to any theory, it is believed that the at least substantially hydrated metal salt free 3D printed metal object 42 and/or the patterned 3D printed metal object 42' may maintain its shape due, for example, to: i) low level necking occurring between the metallic build material particles 16 and the dehydrated metal salt and/or ii) capillary forces pushing the metallic build material particles 16 together generated by the removal of the water from the hydrated metal salt. The at least substantially hydrated metal salt free 3D printed metal object 42 may maintain its shape even though the metallic build material particles 16 are not yet sintered because of a continuous phase formed by the dehydrated metal salt. Heating to form the at least substantially hydrated metal salt free 3D printed metal object 42 may begin the initial stages of sintering, which can result in the formation of weak bonds that are strengthened during final sintering.

In some examples, the 3D printed metal object 42' may be cleaned to remove unpatterned metallic build material particles 16 from its surface. In an example, the 3D printed metal object 42' may be cleaned with a brush and/or an air jet. Other examples of cleaning procedures include rotary tumbling or vibratory agitation in the presence of low density tumbling media, ultrasonic agitation in a liquid, or bead blasting.

After the extraction and/or the cleaning of the 3D printed metal object 42', the 3D printed metal object 42' and/or the at least substantially hydrated metal salt free 3D printed metal object 42 may be sintered to form the final metallic part 50, also as shown in FIG. 2F. During heating 52 to sinter using heat source 32, the dehydrated metal salt and some of the corresponding metal oxide, if any is remaining, can be fully reduced down to the corresponding metal thereby forming the metallic part 50.

Heating to sinter is accomplished at a sintering temperature that is sufficient to sinter the remaining metallic build material particles 16. The sintering temperature is highly dependent upon the composition of the metallic build material particles 16. During heating/sintering, the at least substantially hydrated metal salt free 3D printed metal object 42 and/or the 3D printed metal object 42' may be heated to a temperature ranging from about 80% to about 99.9% of the melting point or the solidus, eutectic, or peritectic temperature of the metallic build material 16. In another example, the at least substantially hydrated metal salt free 3D printed metal object 42 and/or the 3D printed metal object 42' may be heated to a temperature ranging from about 90% to about 95% of the melting point or the solidus, eutectic, or peritectic temperature of the metallic build material 16. In still another example, the at least substantially hydrated metal salt free 3D printed metal object 42 and/or the 3D printed metal object 42' may be heated to a temperature ranging from about 60% to about 85% of the melting point or the solidus, eutectic, or peritectic temperature of the metallic build material 16. In another example, supersolidus sintering, where T sintering> T solidus but < T liquidus, can be used.

The sintering heating temperature may also depend upon the particle size and time for sintering (i.e., high temperature exposure time). As an example, the sintering temperature may range from about 850° C. to about 2500° C. In another example, the sintering temperature is at least 900° C. An example of a sintering temperature for bronze is about 850° C., and an example of a sintering temperature for stainless steel is about 1300° C. While these temperatures are described as sintering temperature examples, it is to be understood that the sintering heating temperature depends upon the metallic build material 16 that is utilized, and may be higher or lower than the described examples. Heating at a suitable temperature sinters and fuses the metallic build material particles 16 to form a completed metallic part 50, which may be even further densified relative to the at least substantially hydrated metal salt free 3D printed metal object 42. For example, as a result of sintering, the density may go from 50% density to over 90%, and in some cases very close to 100% of the theoretical density.

The length of time at which the heat 52 for sintering is applied and the rate at which the part 42' or 42 is heated may be dependent, for example, on: characteristics of the heat or radiation source 32, characteristics of the hydrated metal salt, characteristics of the metallic build material 16 (e.g., metal type or particle size), and/or the target characteristics of the metallic part 50 (e.g., wall thickness).

The at least substantially hydrated metal salt free 3D printed metal object 42 and/or the 3D printed metal object 42 may be heated at the thermal decomposition temperature for a thermal decomposition time period ranging from about 10 minutes to about 72 hours or from about 30 minutes to about 12 hours. In an example, the thermal decomposition time period is 60 minutes. In another example, thermal decomposition time period is 180 minutes. The at least substantially hydrated metal salt free 3D printed metal object 42 and/or the 3D printed metal object 42' may be heated to the thermal decomposition temperature at a rate ranging from about 0.5° C./minute to about 20° C./minute. The heating rate may depend, in part, on: the amount of the continuous dehydrated metal salt phase in the at least substantially hydrated metal salt free 3D printed metal object 42 and/or the 3D printed metal object 42, the porosity of the at least substantially hydrated metal salt free 3D printed metal object 42 and/or the 3D printed metal object 42', and/or the characteristics of the at least substantially hydrated metal salt free 3D printed metal object 42 and/or the 3D printed metal object 42/the metallic part 50 (e.g., size or wall thickness).

The at least substantially hydrated metal salt free 3D printed metal object 42 and/or the 3D printed metal object 42 may be heated at the sintering temperature for a sintering time period ranging from about 20 minutes to about 15 hours. In an example, the sintering time period is 240 minutes. In another example, the sintering time period is 360 minutes. The at least substantially hydrated metal salt free 3D printed metal object 42 may be heated to the sintering temperature at a rate ranging from about 1° C./minute to about 20° C./minute. In an example, the at least substantially hydrated metal salt free 3D printed metal object 42 and/or the 3D printed metal object 42 is heated to the sintering temperature at a rate ranging from about 10° C./minute to about 20° C./minute. A high ramp rate up to the sintering temperature may be useful to produce a more favorable grain structure or microstructure. However, in some instances, slower ramp rates may be useful. As such, in another example, the at least substantially hydrated metal salt free 3D printed metal object 42 and/or the 3D printed metal object 42 is heated to the sintering temperature at a rate ranging from about 1° C./minute to about 3° C./minute. In yet another example, the at least substantially hydrated metal salt free 3D printed metal object 42 and/or the 3D printed metal object 42 is heated to the sintering temperature at a rate of about 1.2° C./minute. In still another example, the at least substantially hydrated metal salt free 3D printed metal object 42 and/or the 3D printed metal object 42 is heated to the sintering temperature at a rate of about 2.5° C./minute.

In some examples, the heating of the at least substantially hydrated metal salt free 3D printed metal object 42 and/or the 3D printed metal object 42 to the thermal decomposition temperature is performed for a thermal decomposition time period ranging from about 10 minutes to about 72 hours or from about 30 minutes to about 12 hours; and the heating of the at least substantially hydrated metal salt free 3D printed metal object 42 and/or the 3D printed metal object 42 to the sintering temperature is performed for a sintering time period ranging from about 20 minutes to about 15 hours. In some examples, the heating of the at least substantially hydrated metal salt free 3D printed metal object 42 and/or the 3D printed metal object 42 to the thermal decomposition temperature is accomplished at a rate ranging from about 0.5° C./minute to about 10° C./minute; and the heating of the at least substantially hydrated metal salt free 3D printed metal object 42 and/or the 3D printed metal object 42 to the sintering temperature is accomplished at a rate ranging from about 1° C./minute to about 20° C./minute.

In some examples, the heat 52 for sintering is applied in an environment containing an inert gas, a low reactivity gas, a reducing gas, or a combination thereof. In other words, the heating of the at least substantially hydrated metal salt free 3D printed metal object 42 and/or the 3D printed metal object 42 to the thermal decomposition temperature and the heating of the at least substantially hydrated metal salt free 3D printed metal object 42 and/or the 3D printed metal object 42 to the sintering temperature are accomplished in an environment containing an inert gas, a low reactivity gas, a reducing gas, or a combination thereof.

The sintering may be accomplished in an environment containing an inert gas, a low reactivity gas, and/or a reducing gas so that the metallic build material 16 will sinter rather than undergoing an alternate reaction (e.g., an oxidation reaction) which would fail to produce the metallic part 50. Examples of inert gas include but are not limited to argon gas, or helium gas. An example of a low reactivity gas includes nitrogen gas, and examples of reducing gases include but are not limited to hydrogen gas, or carbon monoxide gas.

In some examples, the heat 52 for sintering is applied in an environment containing carbon in addition to an inert gas, a low reactivity gas, a reducing gas, or a combination thereof. The sintering may be accomplished in an environment containing carbon to reduce the partial pressure of oxygen in the environment and further prevent the oxidation of the metallic build material 16 during sintering. An example of the carbon that may be placed in the heating environment includes graphite rods. In other examples, a graphite furnace may be used.

In some examples, the heat 52 is applied in a low gas pressure or vacuum environment. The sintering may be accomplished in a low gas pressure or vacuum environment so that the continuous metal oxide phase thermally decomposes to the corresponding metal and/or to prevent the oxidation of the metallic build material 16. Moreover, sintering at the low gas pressure or under vacuum may allow for more complete or faster pore collapse, and thus higher density parts. However, vacuum may not be used during sintering when the metallic build material 16 (e.g., Cr) is capable of evaporating in such conditions. In an example, the low pressure environment is at a pressure ranging from about 1E-6 Torr ($1*10^{-6}$ Torr) to about 10 Torr.

Although not shown, the operations depicted in FIGS. 2E and 2F may be automated and the controller 28 may control the operations.

Figure 3:
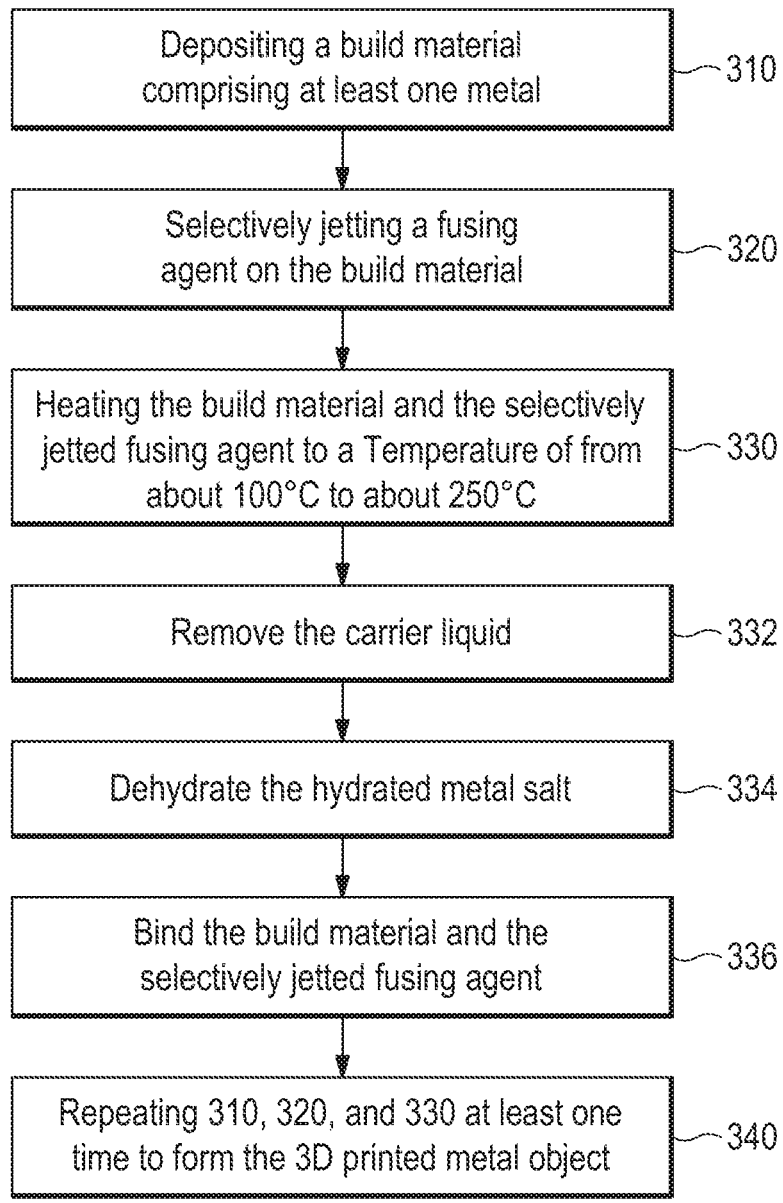
FIG. 3 is a flow diagram illustrating an example of a 3D printing method disclosed herein.

FIG. 3 is a flow diagram illustrating an example of a 3D printing method disclosed herein. In this example, the method of forming a 3D printed metal object can comprise depositing a build material comprising at least one metal (310); selectively jetting a fusing agent on the build material (320); heating the build material and the selectively jetted fusing agent to a temperature of from about 100° C. to about 250° C. to (330): remove the carrier liquid (332), dehydrate the hydrated metal salt (334), and bind the build material and the selectively jetted fusing agent (336); and repeating 310, 320, and 330 at least one time to form the 3D printed metal object (340).

Figure 4:
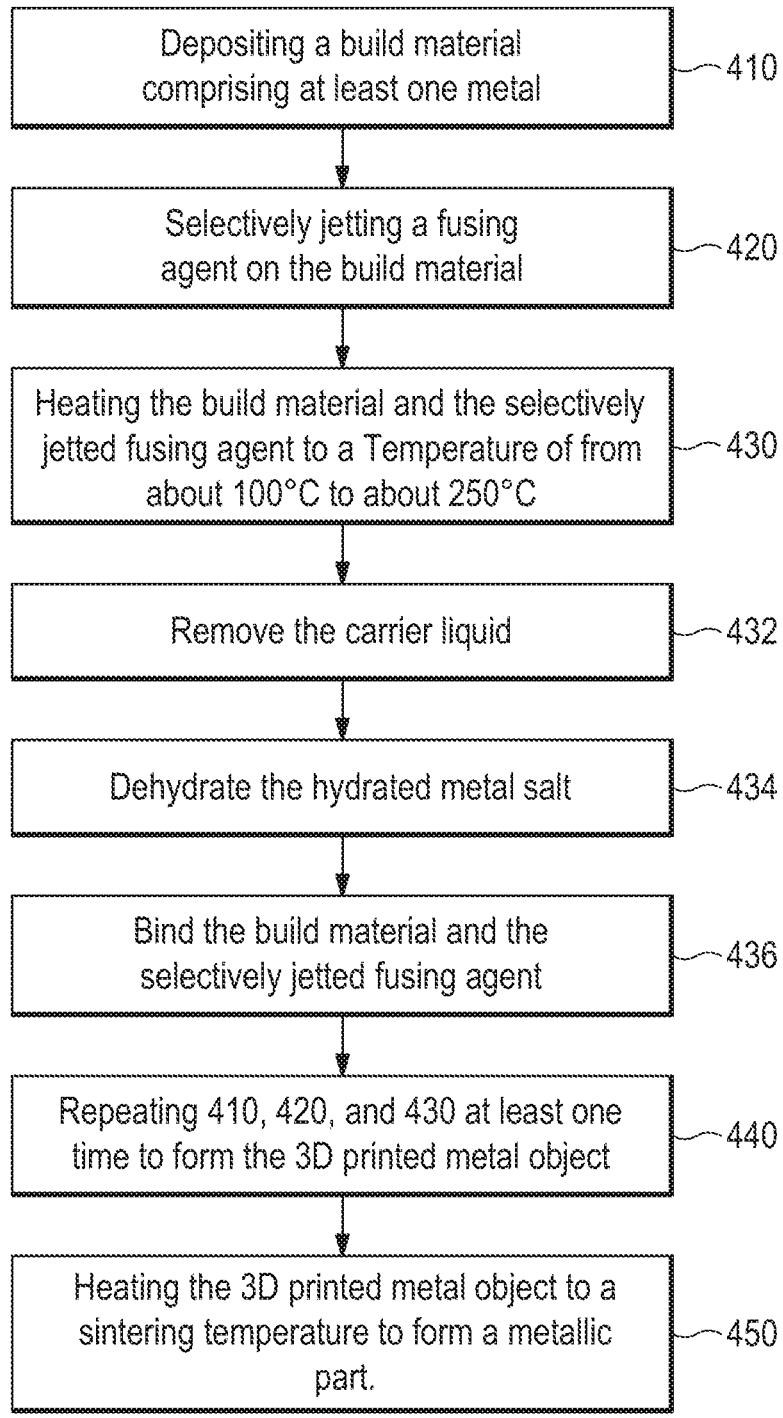
FIG. 4 is a flow diagram illustrating an example of another 3D printing method disclosed herein.

FIG. 4 is a flow diagram illustrating an example of another 3D printing method disclosed herein. In this example, the method of forming a 3D printed metal object can comprise depositing a build material comprising at least one metal (410); selectively jetting a fusing agent on the build material (420); heating the build material and the selectively jetted fusing agent to a temperature of from about 100° C. to about 250° C. to (430): remove the carrier liquid (432), dehydrate the hydrated metal salt (434), and bind the build material and the selectively jetted fusing agent (436); repeating 410, 420, and 430 at least one time to form the 3D printed metal object (440); and heating the 3D printed metal object to a sintering temperature to form a metallic part (450).

Figure 5:
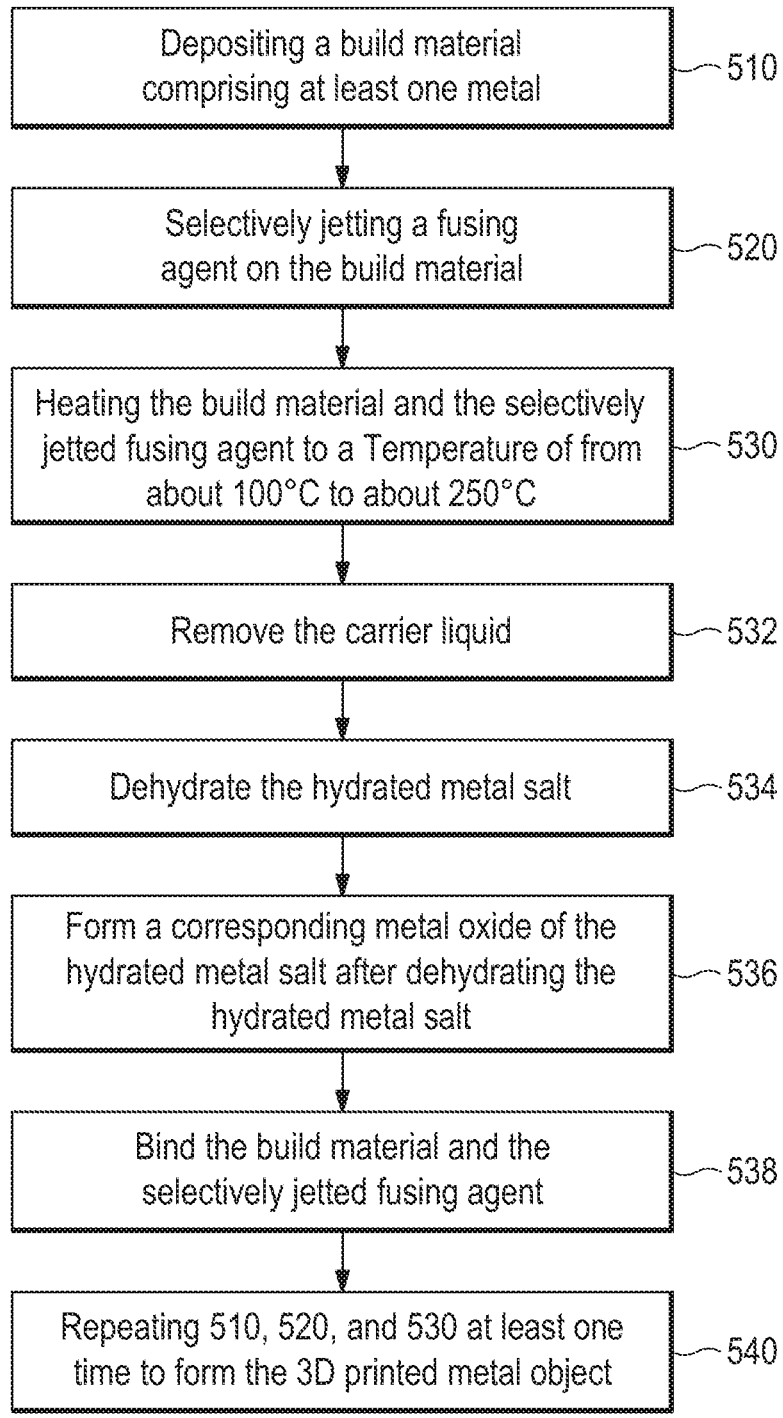
FIG. 5 is a flow diagram illustrating an example of yet another 3D printing method disclosed herein.

FIG. 5 is a flow diagram illustrating an example of yet another 3D printing method disclosed herein. In this example, the method of forming a 3D printed metal object can comprise depositing a build material comprising at least one metal (510); selectively jetting a fusing agent on the build material (520); heating the build material and the selectively jetted fusing agent to a temperature of from about 100° C. to about 250° C. to (530): remove the carrier liquid (532), dehydrate the hydrated metal salt (534), form a corresponding metal oxide of the hydrated metal salt after dehydrating the hydrated metal salt (536), and bind the build material and the selectively jetted fusing agent (538); and repeating 510, 520, and 530 at least one time to form the 3D printed metal object (540).

Unless otherwise stated, any feature described hereinabove can be combined with any example or any other feature described herein.

In describing and claiming the examples disclosed herein, the singular forms "a," "an," and "the" include plural referents unless the context clearly dictates otherwise.

It is to be understood that concentrations, amounts, and other numerical data may be expressed or presented herein in range formats. It is to be understood that such range formats are used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, so forth. This same applies to ranges reciting a single numerical value.

Reference throughout the specification to "one example," "some examples," "another example," "an example," and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

Unless otherwise stated, references herein to "wt %" of a component are to the weight of that component as a percentage of the whole composition comprising that component. For example, references herein to "wt %" of, for example, a solid material such as polyurethane(s) or colorant(s) dispersed in a liquid composition are to the weight percentage of those solids in the composition, and not to the amount of that solid as a percentage of the total non-volatile solids of the composition.

If a standard test is mentioned herein, unless otherwise stated, the version of the test to be referred to is the most recent at the time of filing this patent application.

All amounts disclosed herein and in the examples below are in wt % unless indicated otherwise.

To further illustrate the present disclosure, examples are given herein. It is to be understood that these examples are described for illustrative reasons and are not to be construed as limiting the scope of the present disclosure.

EXAMPLES

Example 1

Example 3D printed metal objects were printed using metallic build material and a fusing agent shown in Table 1.

TABLE 1

| Components | Example fusing agent (wt %) |
|---|---|
| Liquid Vehicle (40 wt % of 2-pyrrolidinone; 4 wt % DOWFAX ™ 2A1; 0.8 wt % CAPSTONE ® FS-35; 0.032 wt % CARBOSPERSE ™ K-7028; and 55.17 wt % water) | 12.5 |
| Hydrated Metal Salt | 40 |
| Water | Balance |

Example 3D printed metal objects were printed by applying layers of the metallic build material and the fusing agent to form the 3D printed metal objects. The thickness of each layer in the 3D printed metal objects was about 100 μm and the weight ratio of metallic build material to fusing agent in each layer was 9:1. In Example 1, fusing agent was applied by thermal inkjet, but other forms of agent delivery, such as piezoelectric inkjet or continuous inkjet, could be employed. Bulk temperature of the build material in the powder bed was maintained at 80° C. by resistive heaters, and surface temperature of the build material was cycled between 120° C. and 170° C. by application of radiation from overhead infrared lamps. The thermal cycle was sufficient to cure the 3D printed metal objects by evaporating the liquid vehicle and dehydrating the metal salt. The 3D printed metal objects were then easily extracted from the unpatterned metallic build material and cleaned of the unpatterned metallic build material with a brush and air jet. The fracture strength of 3D printed metal objects produced as described in Example 1 was 6.7 MPa.

Example 2

Metal objects were prepared from mixtures of the metallic build materials and hydrated metal salt solutions specified in Table 2 using a molding process. Molded metal objects in the form of rectangular bars were cured on a hotplate in air for 50 minutes at a temperature that evaporated the liquid component of the hydrated metal salt solution and dehydrated the metal salt.

The fracture strength of each of the molded metal objects 1-6 was tested using a 3-point bend test with the objects 1-6 each supported on knife edges and force applied by a cylindrical applicator. The fracture strength was then measured with a force gauge (e.g., MARK-10 Model M3-10) and is summarized in Table 2 below.

TABLE 2

| Molded Metal Objects | Metallic Build Material | Hydrated Metal Salt | Bake T (° C.) | Fracture Strength (MPa) |
|---|---|---|---|---|
| 1 | Goodfellow ™ 50 μm Cu (from Goodfellow Corp, Huntingdon, England Part #: Cu006024 Max particle size: 50 microns Purity: 99% Condition: spherical) | Cu Nitrate | 160 | 10.8 |
| 2 | Goodfellow ™ 50 μm Cu (from Goodfellow Corp, Huntingdon, England Part #: Cu006024 Max particle size: 50 microns Purity: 99% Condition: spherical) | Fe Nitrate | 120 | 6.6 |
| 3 | LPW ™ 30 μm 316 Stainless Steel (LPW Technology Corp, Pittsburgh, PA Part #: LPW-316-AAAV Particle size: 15-45 microns) | Fe Acetate | 120 | 5 |
| 4 | LPW ™ 30 μm 316 Stainless Steel (LPW Technology Corp, Pittsburgh, PA Part #: LPW-316-AAAV Particle size: 15-45 microns) | Cu Nitrate | 130 | 7.4 |
| 5 | LPW ™ 30 μm 316 Stainless Steel (LPW Technology Corp, Pittsburgh, PA Part #: LPW-316-AAAV Particle size: 15-45 microns) | Fe Nitrate | 90 | 7 |
| 6 | LPW ™ 30 μm 316 Stainless Steel (LPW Technology Corp, Pittsburgh, PA Part #: LPW-316-AAAV Particle size: 15-45 microns) | Ni Nitrate | 150 | 5.2 |

Table 2 shows that the 3D printed metal objects 1-6 each have fracture strengths that are very high (i.e., 5 MPa or more). These fracture strengths are higher than the tensile fracture strength of common concrete-3 MPa.

Figure 6:
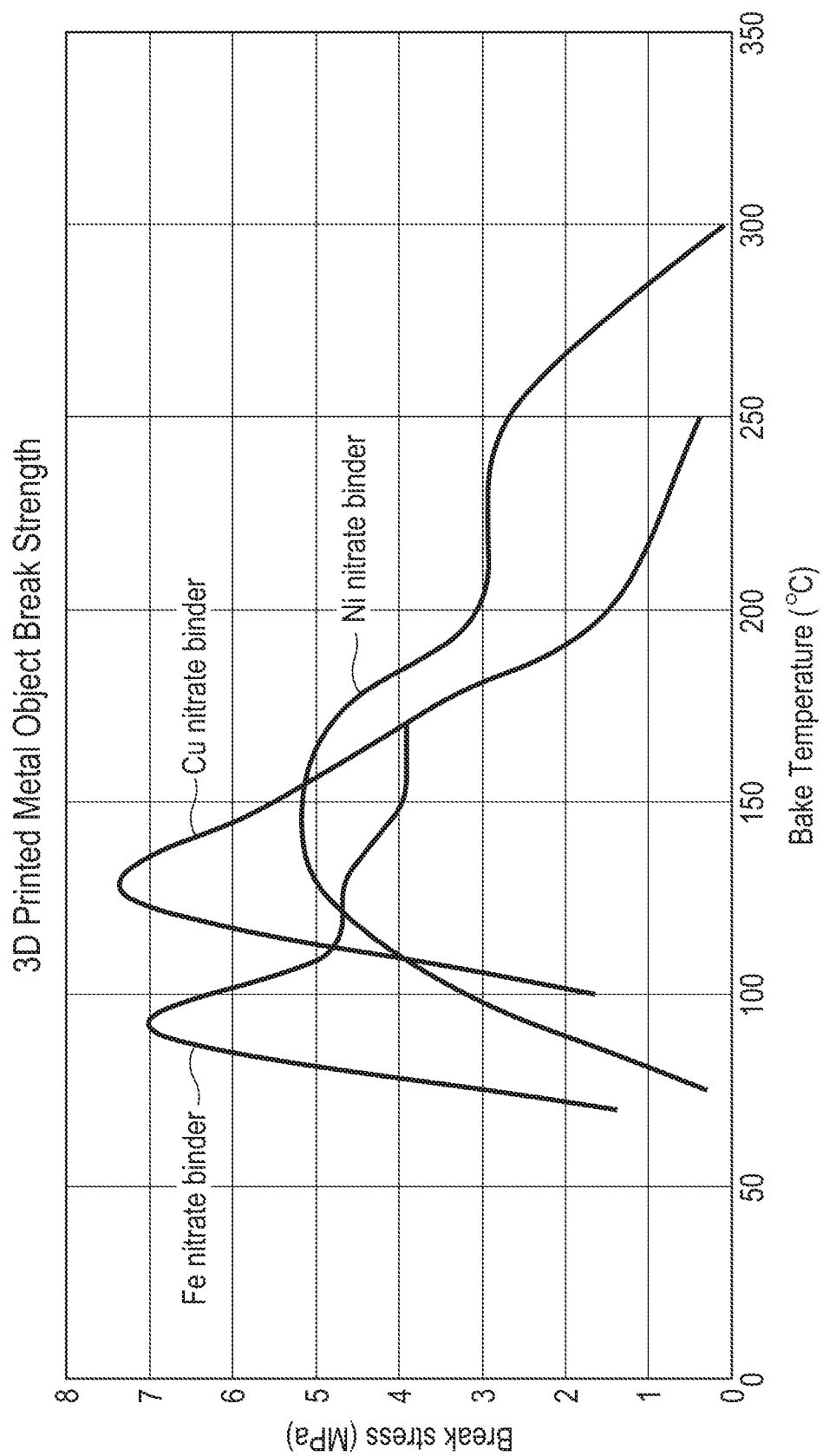
FIG. 6 is a graph showing Break Strengths of 3D printed metal objects using Fe Nitrate Nonahydrate, Cu Nitrate Trihydrate, and Ni Nitrate Hexahydrate.

FIG. 6 shows the 3D printed metal object fracture strength comparison between the 3D printed metal objects 4, 5, and 6 in Table 2 formed from hydrated metal salts—Fe Nitrate Nonahydrate, Cu Nitrate Trihydrate, and Ni Nitrate Hexahydrate. This figure shows that the fracture or break strengths of Fe Nitrate Nonahydrate and Cu Nitrate Trihydrate were higher than that of Ni Nitrate Hexahydrate. FIG. 6 also shows that the 3D printed metal objects had the highest fracture strength when the hydrated metal salts were dehydrated—dehydration temperatures of Fe Nitrate Nonahydrate (about 85° C.), Cu Nitrate Trihydrate (about 125° C.), and Ni Nitrate Hexahydrate (about 150° C.). As shown in FIG. 6, at about 80° C. dehydration of the hydrated metal salts began, then by about 180° C. dehydration was complete, and by about 300° C. thermal decomposition was complete.

Example 3

Figure 7:
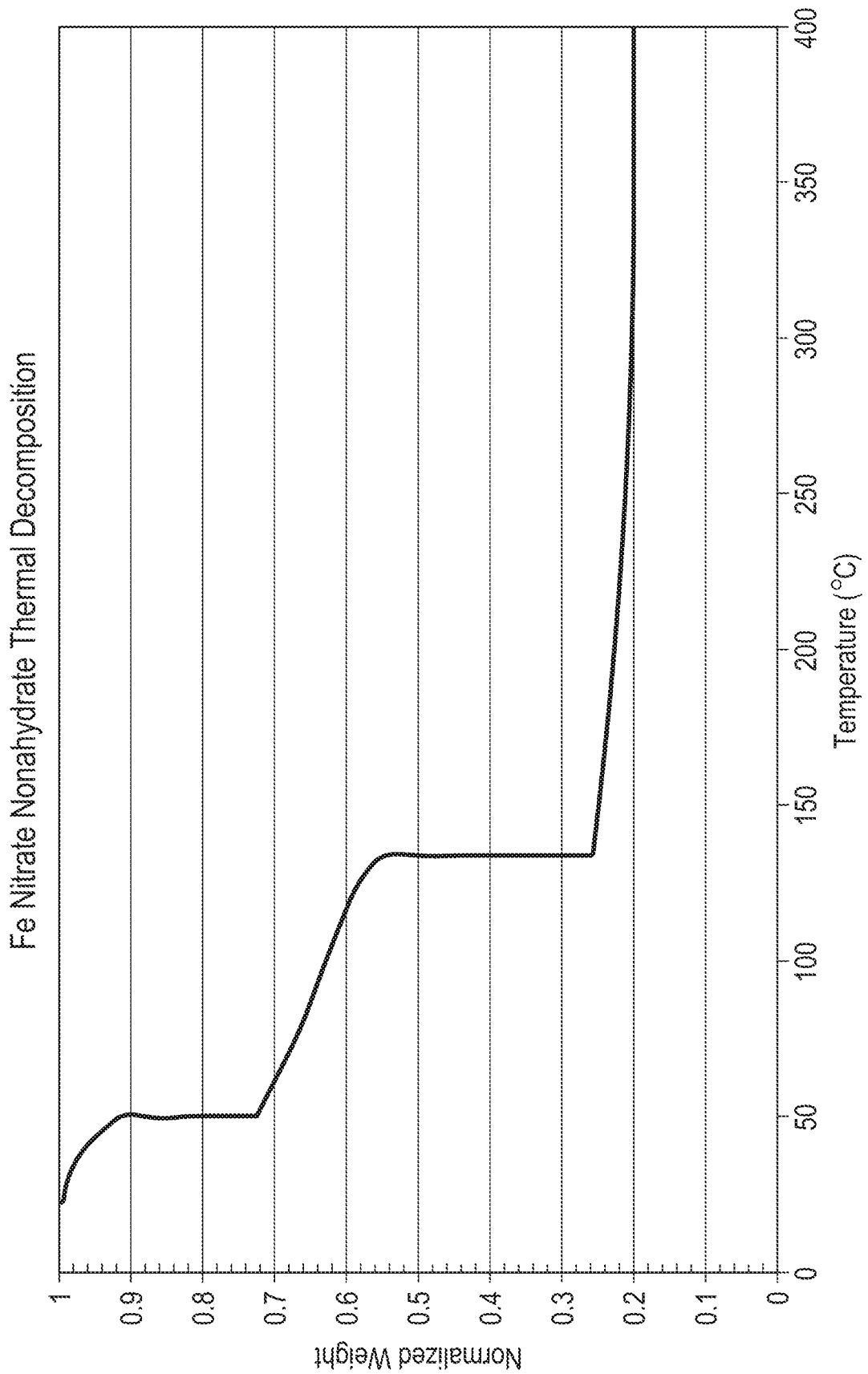
FIG. 7 is a graph showing the decomposition profile of Fe Nitrate nonahydrate measured in Argon using a stepwise isothermal scan.
Figure 8:
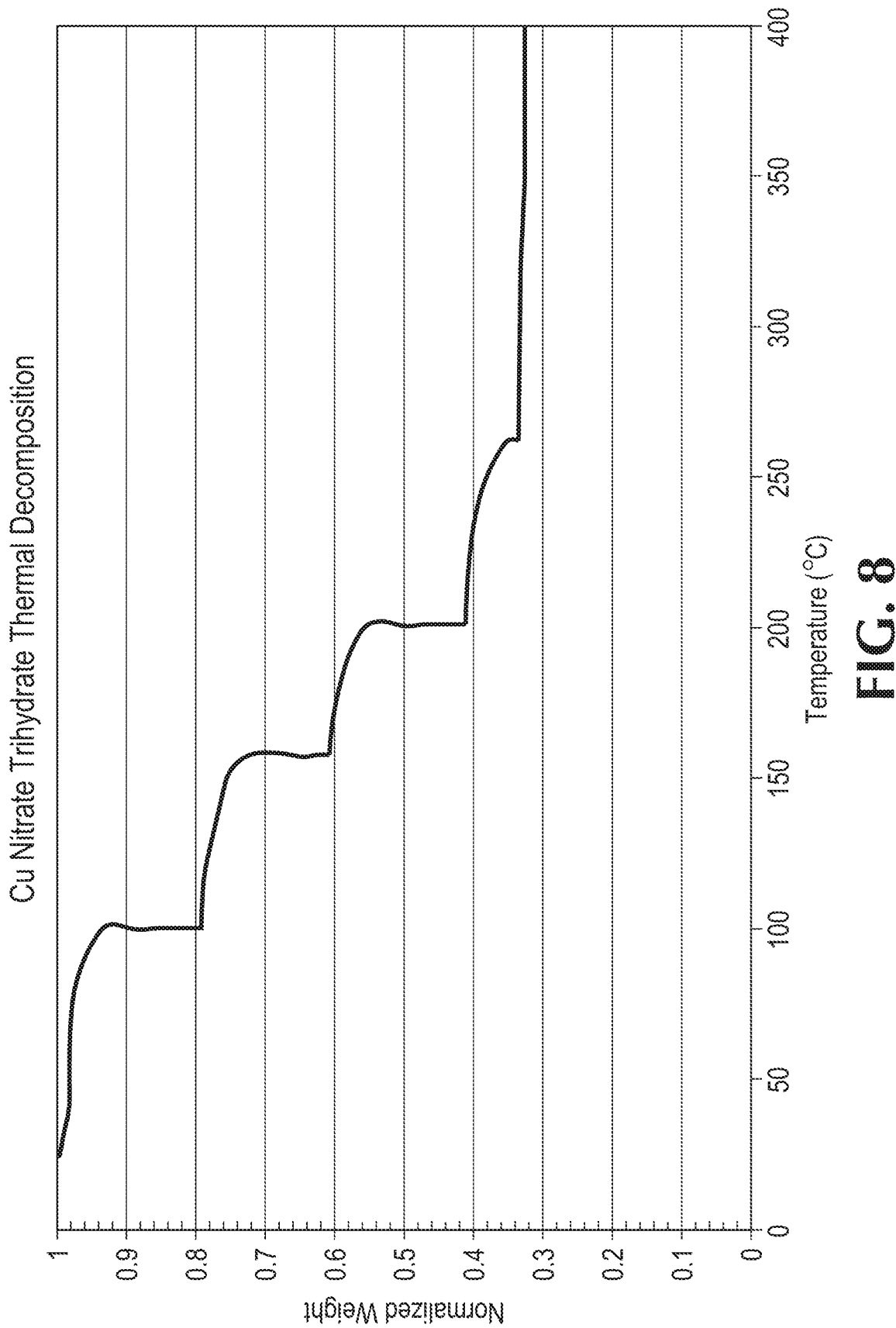
FIG. 8 is a graph showing the decomposition profile of Cu Nitrate trihydrate measured in Argon using a stepwise isothermal scan.
Figure 9:
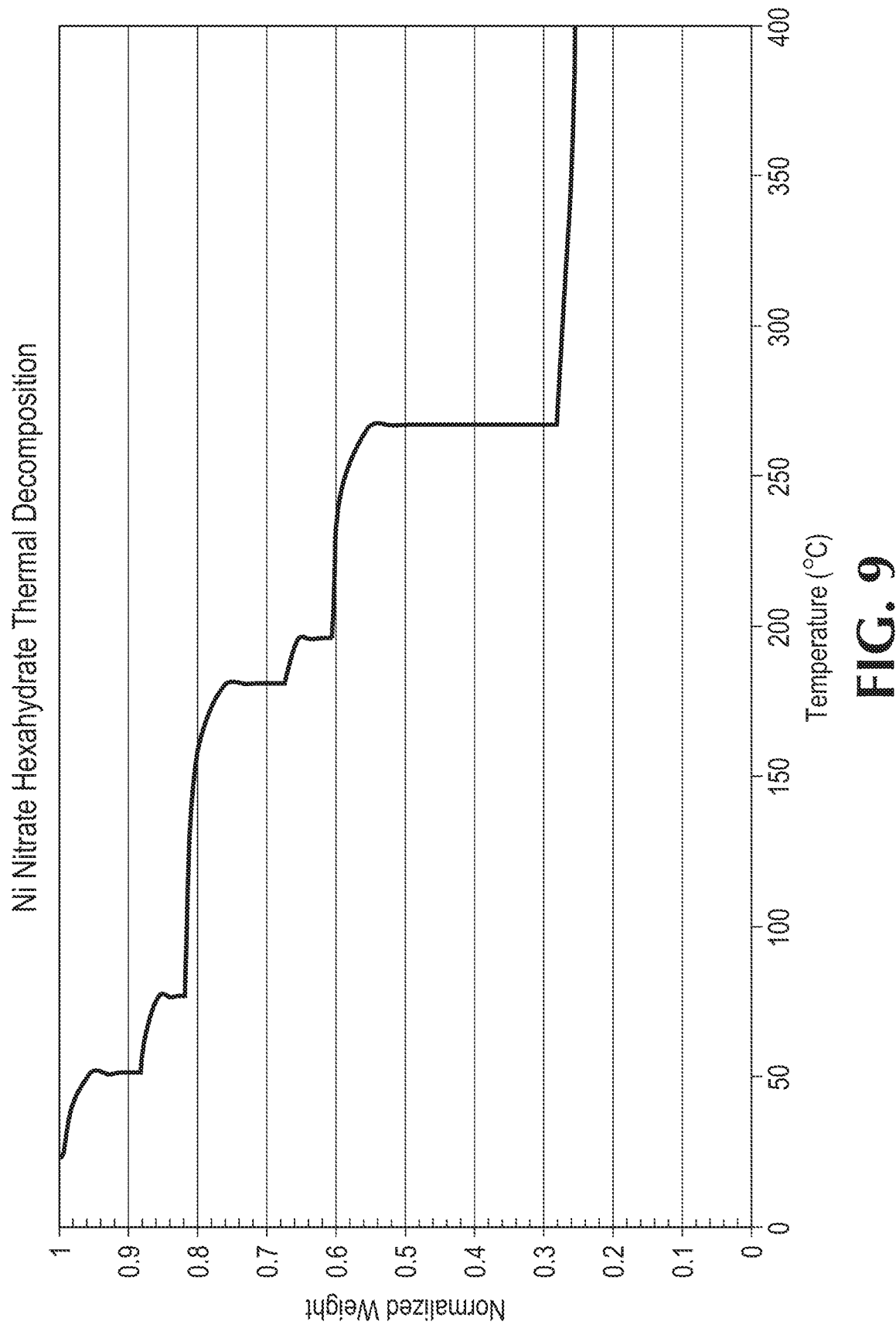
FIG. 9 is a graph showing the decomposition profile of Ni Nitrate hexahydrate measured in Argon using a stepwise isothermal scan.

The thermal decomposition profiles for Fe Nitrate Nonahydrate, Cu Nitrate Trihydrate, and Ni Nitrate Hexahydrate are shown in FIGS. 7, 8, and 9, respectively. Fe Nitrate Nonahydrate, Cu Nitrate Trihydrate, and Ni Nitrate Hexahydrate dehydrate at temperatures of about 50° C., 100° C., and 180° C. These figures show that Fe Nitrate Nonahydrate, Cu Nitrate Trihydrate, and Ni Nitrate Hexahydrate each decomposed at different temperatures—about 170° C., about 250° C., and about 310° C., respectively.

The above examples show that the dehydrated metal salt bound 3D printed metal object is stronger than the hydrated metal salt bound 3D printed metal object. The above examples further show that 3D printed metal objects containing dehydrated metal salts had high fracture strengths that are commonly not achieved using polymeric binders.

Without wishing to be bound by theory, the patterned 3D printed metal object containing the fusing agent comprising the hydrated metal salt is more highly light absorbing by the fusing lamps than the surrounding regions that do not contain the fusing agent suggesting that the metal salt agent facilitates achieving the dehydration temperature more easily.

The hydrated metal salts used in the present fusing agents are generally inexpensive compared with other binding agents including some polymeric binders. This is useful in printing 3D metal objects because the material costs can be lowered, which is commercially aspired to.

In some examples, the hydrated metal salt can be selected for its metal cation to act as a sintering aid (e.g., Cu in steel), which can increase the strength of the final metallic part. In some examples, the metal cation in the hydrated metal salt can be selected to be either a major component of the metallic build material (e.g., Fe in steel) or a useful additive (e.g., Cu in steel).

In some examples, retention of the metal component (i.e., metal from the hydrated metal salt) during the entire process (e.g., printing, decomposition, reduction, or sintering) helps to maintain the 3D metal object strength and may mitigate distortion during sintering. This is in contrast with polymeric binders that are burned off during the process leaving gaps in the 3D metal object structure, which makes the 3D metal object weak.

While several examples have been described in detail, it is to be understood that the disclosed examples may be modified. Therefore, the foregoing description is to be considered non-limiting.

What is claimed is:

1. A method of forming a 3D printed metal object comprising:
   (A) depositing a build material comprising at least one metal;
   (B) selectively jetting a fusing agent on the build material, the fusing agent comprising:
      (i) at least one hydrated metal salt having a dehydration temperature of from about 100° C. to about 250° C., and
      (ii) a carrier liquid comprising at least one surfactant and water;
   (C) heating the build material and the selectively jetted fusing agent to a temperature of from about 100° C. to about 250° C. to:
      (a) remove the carrier liquid,
      (b) dehydrate the hydrated metal salt and form a corresponding dehydrated metal salt, and
      (c) bind the build material and the selectively jetted fusing agent; and
   (D) repeating (A), (B), and (C) at least one time to form the 3D printed metal object.

2. The method of claim 1 further comprising:
   (E) heating the 3D printed metal object to a sintering temperature to form a metallic part.

3. The method of claim 2, wherein the sintering temperature is from about 450° C. to about 1500° C.

4. The method of claim 2, wherein the heating of the three-dimensional object to the sintering temperature is performed for a sintering time period ranging from about 10 minutes to about 20 hours.

5. The method of claim 2, wherein (E) occurs in an environment containing (i) a vacuum or (ii) an inert gas, a low reactivity gas, a reducing gas, or a combination thereof.

6. The method of claim 1 further comprising:
   forming a corresponding metal oxide of the hydrated metal salt after dehydrating the hydrated metal salt in (C)(b); and/or
   forming a corresponding metal of the hydrated metal salt after dehydrating the hydrated metal salt in (C)(b).

7. The method of claim 1, wherein the at least one hydrated metal salt comprises:
   at least one metal cation selected from the group consisting of aluminum, magnesium, copper, zinc, iron, nickel, manganese, cobalt, molybdenum, chromium, tin, vanadium, and combinations thereof; and
   at least one anion selected from the group consisting of hydroxide, carbonate, sulfate, nitrate, acetate, formate, borate, chloride, bromide, and combinations thereof.

8. The method of claim 7, wherein the at least one hydrated metal salt is selected from the group consisting of hydrated copper nitrate, hydrated iron nitrate, hydrated nickel nitrate, hydrated manganese nitrate, hydrated cobalt nitrate, hydrated iron acetate, and combinations thereof.

9. The method of claim 7, wherein the at least one metal in the build material is the same as the metal cation in the at least one hydrated metal salt.

10. The method of claim 1, wherein the at least one hydrated metal salt is present in the fusing agent in an amount of from about 5 wt % to about 50 wt % based on the total weight of the fusing agent.

11. The method of claim 1, wherein the 3D printed metal object has a fracture strength of from about 5 MPa to about 20 MPa.

12. The method of claim 1, wherein:
   the corresponding dehydrated metal salt is present in the 3D printed metal object in an amount of from about 0.2 wt % to about 20 wt % based on the total weight of the 3D printed metal object; and
   a corresponding metal oxide of the hydrated metal salt is present in the 3D printed metal object in an amount of from about 0 wt % to about 10 wt % based on the total weight of the 3D printed metal object.

13. The method of claim 1, wherein the 3D printed metal object is an at least substantially hydrated metal salt free 3D printed metal object.

* * * * *